(12) United States Patent
Tsujimoto

(10) Patent No.: US 6,695,989 B1
(45) Date of Patent: Feb. 24, 2004

(54) APPARATUS AND METHOD FOR MANUFACTURING GRANULES

(75) Inventor: Hiroyuki Tsujimoto, Hirakata (JP)

(73) Assignee: Hosokawa Micron Corp., Osaka (JP)

( * ) Notice: Subject to any disclaimer, the term of this patent is extended or adjusted under 35 U.S.C. 154(b) by 0 days.

(21) Appl. No.: 09/936,971

(22) PCT Filed: Mar. 17, 2000

(86) PCT No.: PCT/JP00/01632
§ 371 (c)(1),
(2), (4) Date: Sep. 18, 2001

(87) PCT Pub. No.: WO00/54876
PCT Pub. Date: Sep. 21, 2000

(30) Foreign Application Priority Data

| Mar. 18, 1999 | (JP) | 11-072994 |
| Apr. 30, 1999 | (JP) | 11-124066 |
| Aug. 5, 1999 | (JP) | 11-222290 |
| Dec. 1, 1999 | (JP) | 11-342012 |

(51) Int. Cl.[7] .................................. B29B 9/10
(52) U.S. Cl. ........................... 264/7; 264/14; 425/6
(58) Field of Search ...................... 264/7, 14; 425/6

(56) References Cited

U.S. PATENT DOCUMENTS

| 1,779,849 A | 10/1930 | Lusk .................... 239/116 |
| 2,644,717 A | 7/1953 | Kopperschmidt ........ 299/86 |
| 2,754,192 A | 7/1956 | Bray et al. ............... 71/54 |
| 4,283,012 A | 8/1981 | Hanson .................. 239/118 |
| 4,848,673 A | 7/1989 | Masuda et al. ............ 241/5 |
| 4,946,654 A | 8/1990 | Uhlemann et al. ....... 422/140 |
| 5,632,102 A | 5/1997 | Luy et al. ................ 34/582 |

FOREIGN PATENT DOCUMENTS

| EP | 0596380 | 5/1994 | ........ B05B/7/00 |
| JP | 5347230 | 12/1978 | |
| JP | 4071632 | 3/1992 | |
| JP | 7289877 | 11/1995 | |
| JP | 8192039 | 7/1996 | |

OTHER PUBLICATIONS

English Abstract Patent No. JP 9103668 entitled "Powder treating apparatus for e.g. mixing, drying, and surface treating–comprises rotary disc encasing with nozzles for ejecting powder to treating section"; dated Apr. 22, 1997.

Primary Examiner—Mary Lynn Theisen
(74) Attorney, Agent, or Firm—Webb Ziesenheim Logsdon Orkin & Hanson, P.C.

(57) ABSTRACT

An apparatus and a method for manufacturing granules includes a spray nozzle disposed within a granulating chamber of an apparatus body. The spray nozzle feeds by spraying into the granulating chamber a liquid material comprising at least one of mixture having solid and liquid in a mixed state and solution including solid dissolved therein. An air blow-off portion is provided at a lower region of the granulating chamber for feeding air for floating and fluidizing the liquid material and fine particles under granulation inside the granulating chamber. An air exhaust port is provided at an upper region of the granulating chamber for exhausting the air present inside the granulating chamber. The spray nozzle is designed to spray the liquid material upwardly.

16 Claims, 14 Drawing Sheets

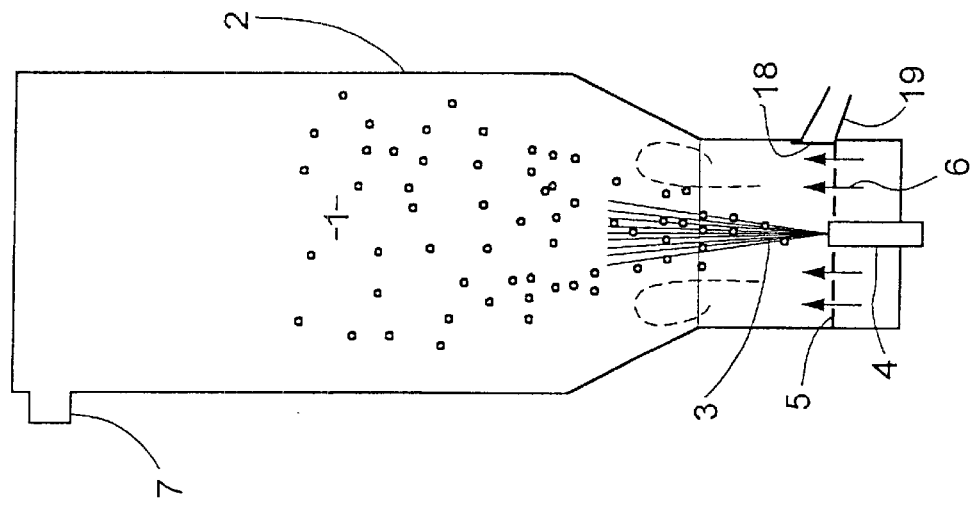
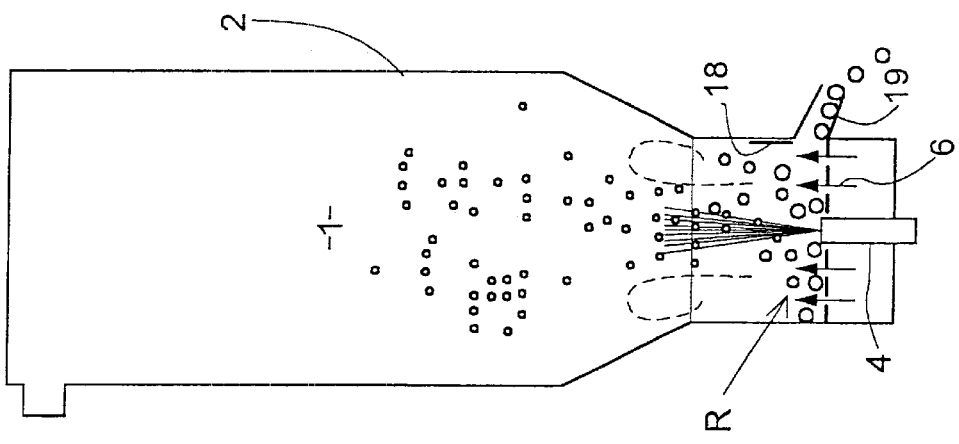
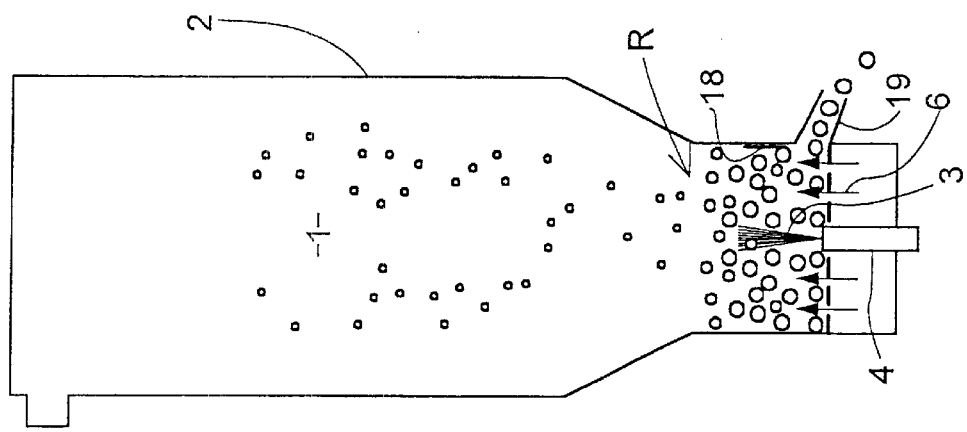

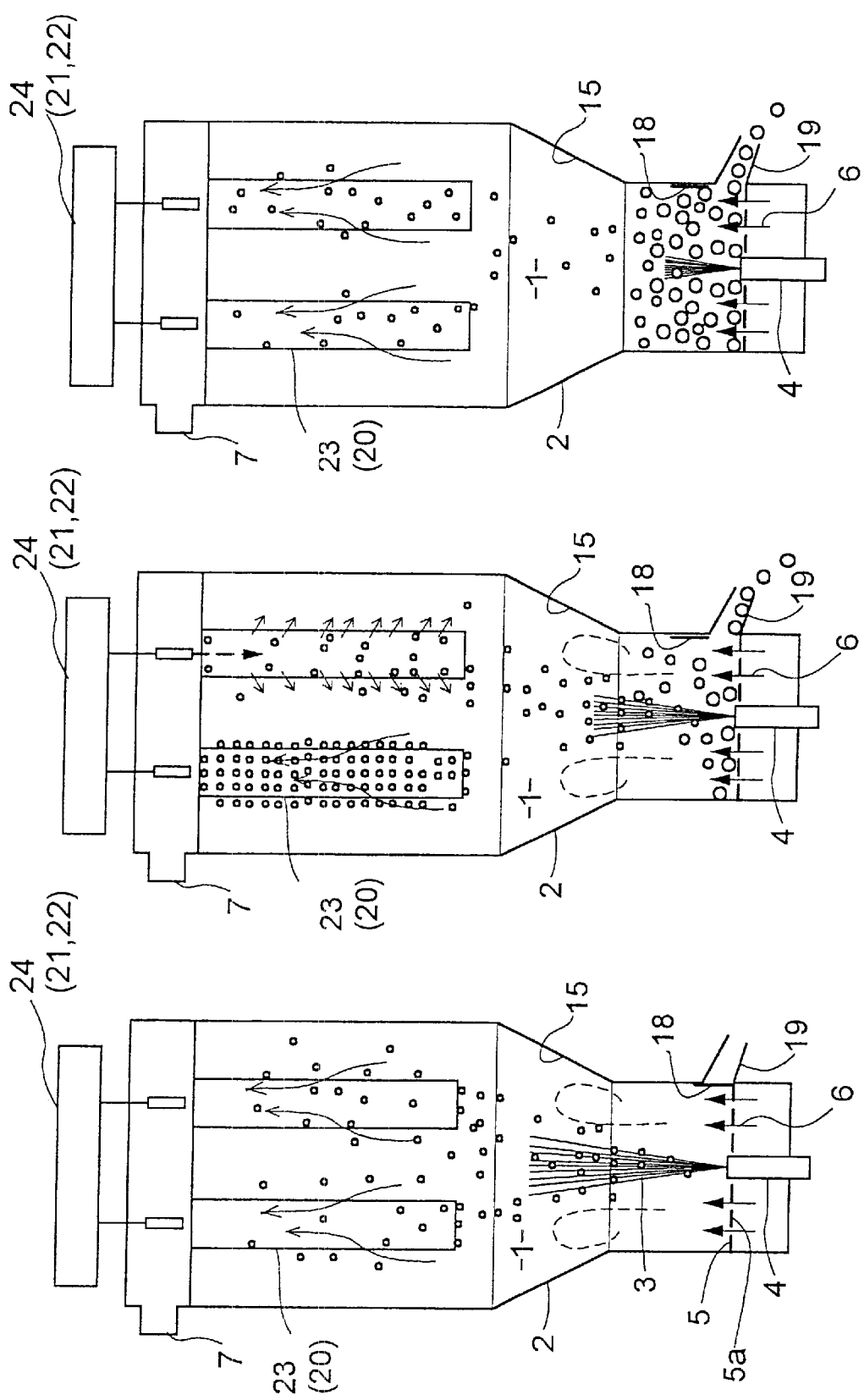

APPARATUS AND METHOD FOR MANUFACTURING GRANULES

BACKGROUND OF THE INVENTION

1. Field of the Invention

The present invention relates to an apparatus for manufacturing granules including a spray nozzle disposed within a granulating chamber of an apparatus body for feeding by spraying into the granulating chamber a liquid material comprising at least one of mixture having solid and liquid in a mixed state and solution including solid dissolved therein, an air blowoff portion provided at a lower region of the granulating chamber for feeding air for floating and fluidizing the liquid material and fine particles under granulation inside the granulating chamber, and an air exhaust port provided at an upper region of the granulating chamber for exhausting the air present inside the granulating chamber. The invention relates also a method of manufacturing granules.

2. Description of the Prior Art

In the discussion to follow, the term "granules" refer to material obtained from fine primary particles by spraying the liquid material to them so that the particles have obtained somewhat increased diameter. The granules may be formed solid or may include a number of voids therein. Also, an aggregate of a plurality of such granules will be referred to hereinafter as a granular element. This granular element may be such that the individual granules are separated to be movable relative to each other or may be also a single agglomeration thereof.

Further, the term "primary particles" refer to seed particles for forming the granules. For instance, as described later herein, they refer to fine particles or the like which are formed when the sprayed liquid material is dried and solidified immediately after being sprayed from the spray nozzle.

SUMMARY OF THE INVENTION

An example of conventional granule manufacturing apparatus is disclosed in Japanese patent application "Kokai" No. Hei. 09-103668.

According to this apparatus, raw material particles serving as seeds for manufacturing granules are stored or charged in advance inside the granulating chamber. These raw material particles are fluidized by means of fluidizing air so as to form a fluidizing layer at a lower region of the granulating chamber Then, liquid material for granulation is sprayed downwardly and laterally from upper and lateral positions of this fluidizing layer to grow the raw material particles.

Specifically, as shown in FIG. 22, the raw material particles are stored at the bottom of the granulating chamber 1. At this bottom, there is mounted a rotor 42 rotatable about a vertical shaft 44. The rotor 42 defines a number of vent holes, through which fluidizing air 6 is supplied from under the rotor 42 to form an upwardly oriented air current inside the granulating chamber 1, whereby the fluidizing layer R is formed immediately above the rotor 42. To this fluidizing layer R, the liquid material 3 is sprayed from spray nozzles 4 disposed upwardly and laterally of the fluidizing layer R in directions opposed to and transverse the flow of the fluidizing air 6, so as to grow the raw material particles to manufacture the granules.

However, when this conventional manufacturing apparatus is employed for manufacturing spherical and heavy granules with sharp size distribution, the following problems exist.

Namely, with the conventional manufacturing apparatus, it is necessary to prepare the raw material particles in advance inside the granulating chamber. In order to charge them into the granulating chamber to use them as raw material particles, certain conditions need to be satisfied, such as the particles should not be coagulated easily and the size distribution should be uniform. For this reason, the preparation of the raw material would tend to be troublesome, imposing a certain limit in improving the manufacturing efficiency of the granules.

Further, with the conventional manufacturing apparatus, the spray nozzle 4 for downwardly spraying the liquid material 3 is disposed at an upper position inside the granulating chamber 1. And, this spray nozzle 4 sprays the liquid material 3 in the direction opposing the air 6 blown upward from the lower region of the granulating chamber 1. The liquid material 3, which is formed into fine droplets (mist) as the result of spraying, adheres to the raw material particles inside the fluidizing layer R to grow these raw material particles. However, in order to ensure that the downwardly sprayed liquid material 3 reaches the fluidizing layer R, it is necessary to limit the momentum of the upwardly directed air 6 to a certain extent. As a result, the space between the raw material particles inside the fluidizing layer R becomes insufficient, thus tending to invite coagulation of the raw material particles. For this reason, the granules obtained by using the conventional manufacturing apparatus tend to have a wide size distribution.

Moreover, the granules obtained by the above-described process tend to have a structure with many voids. Hence, it was difficult to obtain heavy granules.

Incidentally, another type of conventional apparatus includes a mechanism for intermittently blowing high-pressure air against the fluidizing layer R. For instance, the apparatus includes a plurality of jet nozzles 46 mounted along the periphery of the apparatus body 2 for discharging the air or gas against the fluidizing layer R. And, these respective nozzles 46 are mounted so that the gas discharging directions from all the nozzles will be focused at a single point within the fluidizing layer R.

Then, the particles inside the fluidizing layer R will blown by the high-pressure air currents toward the center of the granulating chamber 1 to collide against each other. This collision adds to the pulverizing effect of the counter jet mill, so that the granules tending to coagulate will be pulverized or cracked (hereinafter, "crushed"). Consequently, it becomes possible to render the particle diameters of the resultant granules uniform.

However, with the conventional manufacturing apparatus, the granules under granulation would coagulate easily. Hence, it was difficult to allow the above-described crushing effect to manifest itself effectively.

The present invention is intended to solve the above-described drawbacks of the conventional art and to provide a granule manufacturing apparatus and method capable of manufacturing spherical and heavy granules of a desired particle diameter in an efficient manner.

DISCLOSURE OF THE INVENTION

The characterizing features of the granule manufacturing apparatus and method relating to the present invention are as follows.

The granule manufacturing apparatus according to the present invention, as shown in FIG. 1, is characterized in that the spray nozzle is designed to spray the liquid material upwardly, the granulating chamber includes a cylindrical wall portion and a generally conical wall portion; the spray nozzle is disposed at a lower center region of the granulating chamber; the cylindrical wall portion is provided at a portion beside the nozzle; the nozzle includes a spraying opening which is located at a top or inwardly of a conical plane including the wall portion; and a bag filter is disposed between the spray nozzle and the air exhaust port, the bag filter having a backwashing unit, the bag filter providing the function of sweep-off means for sweeping off solids collected on the bag filter as well as the function of pressure applying means for momentarily increasing the pressure inside the granulating chamber.

If the liquid material is sprayed upward as proposed by the above construction, the spraying direction and the air supplying direction agree to each other. So that the spraying of the liquid material will proceed smoothly to ensure a sufficient floating period for the spray droplets of the liquid material. Thus, these spray droplets will be solidified completely to be formed into primary particles without coagulation with other primary particles. The effect of prevention of coagulation can be provided also during the subsequent process of the primary particles growing into the granules.

If no coagulation of granules occurs during granulation as described above, the granules will not combine each other to form granules of an excessively large particle diameter. And, the growth of the granules during granulation process will proceed in a continues manner, so that granules with reduced particle size difference may be obtained. For instance, if granules having a narrower size distribution are obtained as above, then, such additional device as a classifier, which is needed by the standard manufacturing apparatus, would be omitted. Therefore, it becomes possible also to form the manufacturing apparatus compact.

Also, if the spray nozzle is disposed at a lower region of the granulating chamber, it is possible to secure a large space in the spraying direction of the liquid material. Hence, it is possible to restrict mutual coagulation of the granules during the manufacture and also to extend the floating and flowing period of the sprayed droplets, thus allowing the liquid material to be dried and solidified reliably. And, if the nozzle is disposed at the center of the granulating chamber, it is possible to secure a substantially constant distance from the nozzle to any position of the cylindrical wall portion, thus helping to prevent adherence of the sprayed liquid material from to a specific portion of the cylindrical wall portion.

Normally, the liquid material sprayed and fed into the granulating chamber will be dispersed more as it floats and flows upwardly. Then, by providing the generally conical wall portion having a progressively increasing width upwardly, this serves to reduce the opportunity for the upwardly floating granules to adhere to the wall portion. As a result, mutual coagulation of granules may be further restricted and the floating period may be extended also, whereby the drying and solidifying process of the granules may proceed reliably.

And, in particular, if the cylindrical wall portion is provided at a portion beside the nozzle and the nozzle includes a spraying opening which is located at a top or inwardly of a conical plane including the wall portion, dispersion of the liquid material sprayed from the spray nozzle may be restricted to some extent by the air. So that, it is possible to e.g. prevent adherence of the liquid material to the cylindrical wall portion, whereby the liquid material may be caused to float inside the granulating chamber in a reliable manner.

Moreover, with this construction, the spraying direction of the liquid material from the nozzle is caused to agree substantially with the extending direction of the wall portion, so that the possibility of adherence of the liquid material to the wall portion may be further reduced.

The granule manufacturing apparatus of the invention, as shown in FIG. 6, includes a bag filter having a backwashing unit is disposed at an upper portion of the granulating chamber and between the spray nozzle and the air exhaust port.

The spray droplets of the liquid material will float and flow inside the granulating chamber while being dried and solidified. Since the air inside the granulating chamber flows upward by the exhaustion through the air blowoff portion, the granules of the liquid material too will be gradually drawn to the upper region of the granulating chamber. The granules drawn upward will be collected by the bag filter. This bag filter serves to prevent the granules from being discharged to the outside of the apparatus body when the air in the granulating chamber is exhausted and the filter serves also as an area for allowing the granules to be dried. These collected granules will be dried substantially completely as they remain adhered to the bag filter. In these granules adhered to the bag filter, any moisture present therein has evaporated, so that coagulation of the granules due to the remaining moisture will hardly occur.

This bag filter functions as sweep-off means for sweeping off solids collected on the bag filter. The backwashing unit of the bag filter serves to momentarily cause the air to flow reversely through the filter inside the granulating chamber. The granules after completion of drying thereof by the bag filter will be caused to be dropped off the bag filter again into the granulating chamber by the backwashing unit. The sweeped-off granules will again float and flow inside the granulating chamber and the granules circulated to the vicinity of the spray nozzle will be sprayed again with liquid material from the spray nozzle. These granules coated with liquid material will be dried while floating and flowing inside the granulating chamber and be adsorbed by the bag filter. With repeated cycles of such growth process, granules having a desired particle diameter may be formed.

By using the bag filter having a backwashing unit as proposed by the above-described construction, granules having a predetermined particle diameter may be manufactured within a limited space, so that the entire manufacturing apparatus may be formed compact.

Further, with the granule manufacturing apparatus of the invention, the bag filter functions also as pressure applying means. With this construction, it is possible to momentarily increase the pressure inside the granulating chamber momentarily, thus applying momentary external impact to the periphery of the granule in the course of manufacture thereof As a result, the granules will grow while being compacted at the same time, whereby heavy granules having high strength may be obtained.

As described above, through the effective utilization of the backwashing unit both as the sweep-off means and as the pressure-applying means, it is possible to obtain granules which are heavy, spherical and have high strength. Also, the construction of the manufacturing apparatus may be simplified.

The granule manufacturing apparatus, as shown in FIG. 14, is characterized in that the granulating chamber includes a jet nozzle for jetting high-pressure gas against the fluidizing layer.

With this construction, the granules which have become larger as a result of coagulation in the granulation process may be crushed into a suitable size by means of the high pressure air. Hence, granules having a very narrow size distribution may be obtained. Moreover, by adjusting the strength of the high pressure air, it becomes also possible to set the size of the granules as desired.

The granule manufacturing apparatus, as shown in FIG. 21, is characterized in that the apparatus further comprises a downwardly directed spray nozzle disposed at an upper region inside the granulating chamber for downwardly spraying the liquid material inside the granulating chamber.

According to the manufacturing apparatus having the above construction, the spraying operation of the liquid material inside the granulating chamber is effected by means of the upwardly directed spray nozzle disposed at a lower region of the granulating chamber as well as said downwardly directed spray nozzle. With this construction, the liquid material may be sprayed over a wider area of the granulating chamber. Especially, in order to improve the granulating efficiency when a liquid material having a high drying speed is employed, it is preferred that the liquid material be sprayed by short time intervals. Then, according to this construction, the liquid material is sprayed to nearly all positions inside the granulating chamber. With this, additional liquid material may be caused to adhere to the granulate present at nearly every position during the manufacture process.

The granule manufacturing apparatus, as shown in FIG. 21, is characterized in that the apparatus further comprises a horizontally directed spray nozzle attached to the wall of the granulating chamber for laterally spraying the liquid material relative to the fluidizing air current inside the granulating chamber.

In this case too, by providing the horizontally oriented spray nozzle, the liquid material may be sprayed over a wider area of the granulating chamber. As a result, the amount of the liquid material adhered to each granulate during the manufacture thereof may be rendered uniform, so that the thickness of the liquid film formed on the surface of each granule may be uniform as well. There will occur no sudden growth of granules, and the adhesion and drying cycles of the liquid material may be repeated reliably. Accordingly, no porous structure will be formed and uniform, dense and heavy granules may be obtained.

The granule manufacturing apparatus, as shown in FIG. 13, is characterized in that the bottom of the granulating chamber is constructed of a rotor in the form of a generally circular disc.

By providing a rotor at the bottom of the granulating chamber as proposed by the above construction, one can expect a compacting effect due to the rolling in addition to the compacting effect from the pressure applying means, whereby even heavier and stronger granules may be obtained.

Further, as the granules are caused to roll by the rotor, globurizing of the granules may be further promoted.

Moreover, by providing the rotor, it is possible to manufacture larger granules which can not be blown upward by the air from the air blowoff portion. That is, such large granules will be accumulated on the rotor. But, as this rotor is being rotated, the granules thereon too will roll incessantly, so that the liquid material sprayed from the nozzle may be caused to adhere to the surfaces of the granules uniformly.

The granule manufacturing apparatus, as shown in FIG. 6 and FIG. 8, is characterized in that a jacket for circulating fluid is provided over substantially entire outer periphery of the spray nozzle for optimizing the temperature of the liquid material to be sprayed and supplied, the spray nozzle includes a needle at a liquid spray opening thereof for spraying the liquid material, with a needle being shiftable between an opening position for opening the spray opening for the liquid material and a closing position for closing the spray opening for the liquid material; and when the needle closes the liquid spray opening, the leading end of the needle projects from the liquid spray opening, so that even if solidification of the liquid material tends to occur at the liquid spray opening, the solidified material may be eliminated by the needle, whereby the liquid spray opening may be maintained under a clean condition.

If the jacket is provided over the substantially entire outer periphery of the spray nozzle for optimizing the temperature of the liquid material to be sprayed and supplied as proposed by the above-described construction, it becomes possible to prevent solidification/deterioration of the liquid material within the spray nozzle, so that continuous operation of the manufacturing apparatus becomes readily possible.

Further, by optimizing the temperature of the liquid material, the viscosity of the liquid material may be made suitable for its spraying. Accordingly, e.g. the particle diameter of the sprayed droplets may be rendered uniform and the growth speed of the granules may be rendered constant, whereby quality granules with uniform particle size may be obtained.

Moreover, as shown in FIG. 8, if the spray nozzle includes a needle at a spray opening thereof for spraying the liquid material, with the needle being shiftable between an opening position for opening the spray opening for the liquid material ("liquid spray opening" hereinafter) and a dosing position for closing the spray opening for the liquid material, the following effects can be achieved.

This liquid spray opening is exposed inside the granulating chamber, thus exposed to the fluidizing air. Therefore, of the liquid material present within the spray nozzle, especially a portion thereof present adjacent the liquid spray opening tends to be dried and solidified more easily. If it is solidified, this will lead to abnormality in the opening area or shape of the liquid spray opening, thus resulting in change in the spraying condition of the liquid material, consequently, non-uniformity in the particle diameter of the sprayed droplets. As a result, it becomes difficult to obtain granules of uniform particle size.

With the above-described construction including the needle shiftable at the liquid material spraying opening with the leading end of the needle projecting from the liquid spray opening when the needle closes the liquid spray opening, even if solidification of the liquid material tends to occur at the liquid spray opening, the solidified material may be eliminated by the needle. Accordingly, the liquid spray opening may be maintained under a dean condition. As a result, the manufacturing apparatus may be operated continuously for a longer period of time, whereby the manufacturing efficiency of the granules may be further improved.

The granule manufacturing apparatus, as shown in FIG. 6, is characterized in that the spray nozzle is disposed at a lower region inside the granulating chamber for upwardly spraying the liquid material.

Especially, when the manufacture is to be started from a condition where no raw material particles are charged at all in advance into the granulating chamber, it is important to control the temperature, viscosity, etc. of the liquid material. In particular, at the initial stage of the granulation, the sprayed droplets of the liquid material are very small. Therefore, it is important to control the spraying condition in order to e.g. prevent mutual coagulation of the particles.

Then, if the spray nozzle having the jacket is directed upwards, it becomes possible to optimize the spraying condition of the liquid material at this initial stage of granulation, so that the liquid material may be dispersed sufficiently inside the granulating chamber. Consequently, the granulating efficiency may be improved significantly and granules having narrow size distribution may be manufactured.

According to a method of manufacturing granules, as shown in FIG. 1, for manufacturing granules using a spray nozzle for spraying liquid material upwardly, first, the manufacturing apparatus is constructed such that the granulating chamber includes a cylindrical wall portion and a generally conical wall portion, the spray nozzle is disposed at a lower center region of the granulating chamber, the cylindrical wall portion is provided at a portion beside the nozzle, and also that the nozzle includes a spraying opening which is located at a top or inwardly of a conical plane including the wall portion and a bag filter is disposed between the spray nozzle and the air exhaust port. Then, the method comprises the steps of: discharging a predetermined amount of the air from the air blowoff portion without charging any raw material particles into the granulating chamber; spraying/supplying the liquid material from the spray nozzle into the current of said air; causing sprayed droplets of the liquid material to float and flow inside the granulating chamber to form a group of particles; and spraying/supplying additional liquid material from the spray nozzle to the group of floating and flowing particles for growing the particles into granules, wherein said respective steps are effected while the backwashing unit is operated for sweeping off the solids collected on the bag filter and momentarily increasing the pressure inside the granulating chamber so as to compact the solids.

As proposed by the above construction, if the liquid material is sprayed and supplied to the current of air discharged upward for manufacturing granules, at the initial stage of the granulation, the primary particles formed of the sprayed and supplied liquid material may be caused to float and flow incessantly inside the granulating chamber, thus allowing the primary particles to grow without mutual coagulation thereof Thus, a group of fine particles are formed and consequently granules having a desired particle diameter and also minimized particle diameter variation may be obtained.

Further, with this construction, there is no need for charging raw material particles into the granulating chamber at the start of the granulation. As the granules can be manufactured only by spraying the liquid material, the manufacture efficiency of granules may be improved significantly.

Moreover, as described hereinbefore in the disclosure of the granule manufacturing apparatus relating to the present invention, especially if the spray nozzle is disposed at a lower center region of the granulating chamber, the cylindrical wall portion is provided at a portion beside the nozzle, and also the nozzle includes a spraying opening which is located at a top or inwardly of a conical plane including the wall portion, it is possible to secure a substantially constant distance from the nozzle to any position of the cylindrical wall portion, thus helping to prevent adherence of the sprayed liquid material to a specific portion of the cylindrical wall portion.

And, dispersion of the liquid material sprayed from the spray nozzle may be restricted to some extent by the air. So that, it is possible to e.g. prevent adherence of the liquid material to the cylindrical wall portion, whereby the liquid material may be caused to float inside the granulating chamber in a reliable manner.

Moreover, with this construction, the spraying direction of the liquid material from the nozzle is caused to agree substantially with the extending direction of the wall portion, so that the possibility of adherence of the liquid material to the wall portion may be further reduced.

In addition, by using the bag filter having a backwashing unit as proposed by this construction, like the above-described granule manufacturing apparatus, granules having a predetermined particle diameter may be manufactured within a limited space, so that the entire manufacturing apparatus may be formed compact.

According to a granule manufacturing apparatus, as shown in FIG. 17, the apparatus includes: a spray nozzle disposed within a granulating chamber of an apparatus body for feeding by spraying into the granulating chamber a liquid material comprising at least one of mixture having solid and liquid in a mixed state and solution including solid dissolved therein; an air blowoff portion provided at a lower region of the granulating chamber for feeding air for floating and fluidizing the liquid material and fine particles under granulation inside the granulating chamber; and an air exhaust port provided at an upper region of the granulating chamber for exhausting the air present inside the granulating chamber; the spray nozzle being disposed at a lower center region of the granulating chamber so as to spray the liquid material upwardly;

wherein a bag filter is disposed between the spray nozzle and the air exhaust port, the bag filter having a backwashing unit, the bag filter providing the function of sweep-off means sweeping off solids collected on the bag filter as well as the function of pressure applying means for momentarily increasing the pressure inside the granulating chamber; and the granulating chamber contains a plurality of jet nozzles for jetting high-pressure gas against a fluidizing layer formed in the lower region of the granulating chamber, the jetting direction of the respective jet nozzles being oriented toward the center of the granulating chamber and with slight lower inclination.

With the granule manufacturing apparatus having this construction, since the spraying direction of the liquid material and the supplying direction of the air agree to each other in the upward direction, it is possible to assure the floating period for the sprayed droplets of the liquid material, so that granules may be manufactured without mutual coagulation of the sprayed particles.

Further, with the provision of the bag filter having the backwashing unit, this filter serves to prevent the granules from being discharged to the outside of the apparatus body when the air in the granulating chamber is exhausted and the filter serves also as an area for allowing the granules to be dried. Moreover, with the backwashing unit of the bag filter, the particles adhering to the bag filter may be caused to be dropped off the bag filter again into the granulating chamber to allow continuation of the floating/fluidizing inside the granulating chamber. Further, as the bag filter functions also as the pressure applying means for momentarily increasing the pressure inside the granulating chamber, it is possible to allow the granules to grow while they are being compacted.

And, according to the manufacturing apparatus having this construction, the high pressure air is sprayed against the granules provided with the upward velocity with the fluidizing air, an even stronger impact may be applied to these granules. As a result, even such granules having a stronger mutual coagulating force can be manufactured with effectively restricting coagulation thereof.

Also, even those granules which were not directly crushed will be moved to the inner side of the apparatus body by means of the high pressure gases jetted from the plurality of positions, these granules are caused to collide strongly against each other in the vicinity of the center. Hence, while restricting the growth of granules within a predetermined range, it is possible to obtain granules having a desired particle size.

According to a granule manufacturing apparatus as shown in FIG. 18, in particular, the granulating chamber contains, at four positions about periphery thereof, jet nozzles for jetting high-pressure gas against a fluidizing layer formed in the lower region of the granulating chamber, adjacent two jet nozzles forming a group, the high-pressure airs jetted from this group of jet nozzles intersecting each other inside the fluidizing layer, an intersection point of the one group being different from an intersection point of the other group.

With the manufacturing apparatus having this construction, since the crushing of the granules takes place at a plurality of positions inside the fluidizing layer, it is possible to extend the area affected by the crushing force of the high pressure gas. In this case, however, the impact applied to the granules will be smaller. Still, for instance, when granules having not so strong coagulating force are to be manufactured, it can be more effective to extend the effective area of the impact force than to increase the impact force. With the manufacturing apparatus of this construction, it is possible to efficiently manufacture granules having not so strong coagulating force during the manufacture thereof.

BRIEF DESCRIPTION OF THE DRAWINGS

FIGS. 3–5 are explanatory figures illustrating a manufacturing process of granules, FIGS. 10–12 are explanatory views illustrating a manufacturing process of granules relating to the second embodiment.

DETAILED DESCRIPTION OF THE PREFERRED EMBODIMENTS

Figure 1:
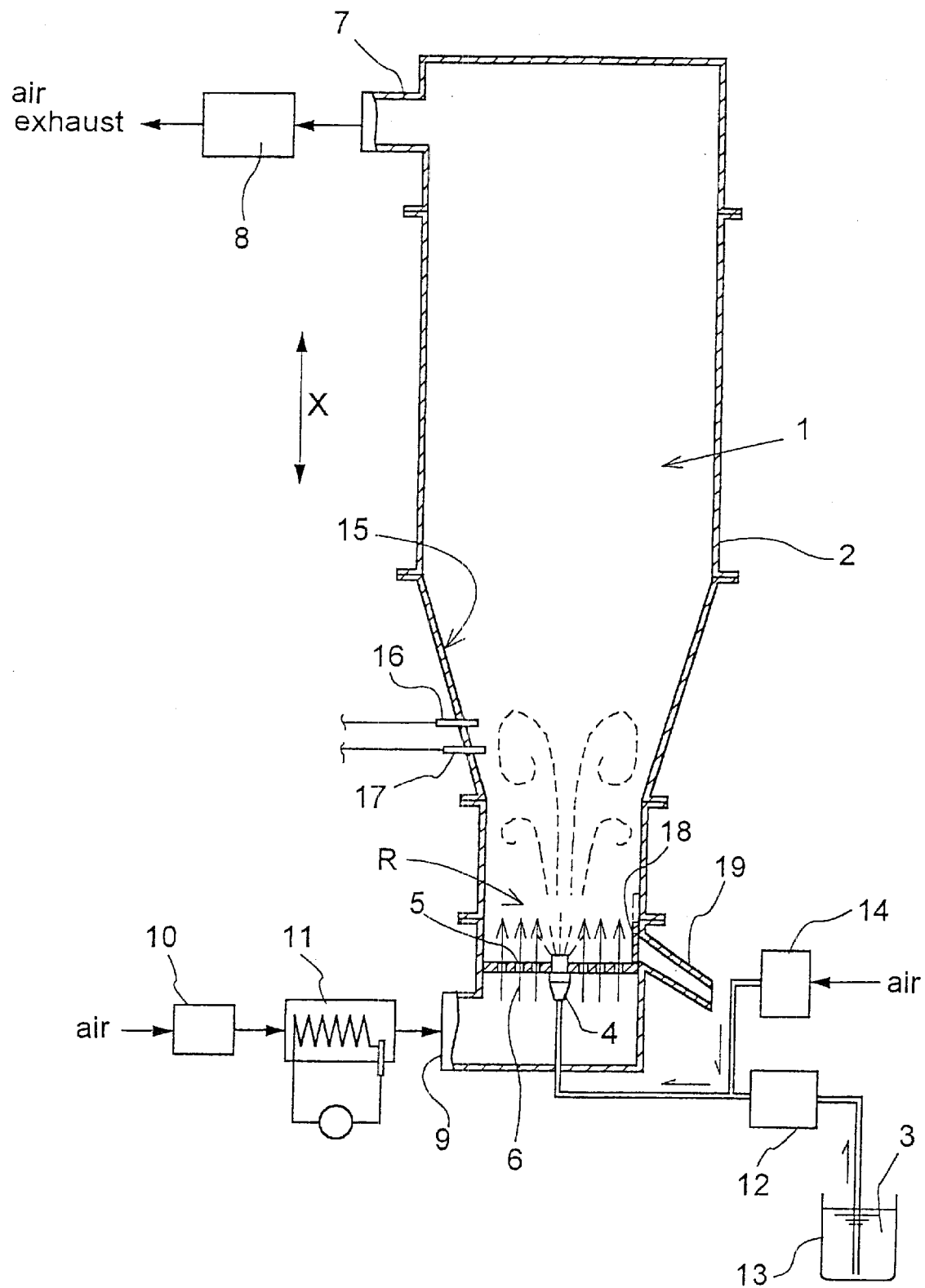
FIG. 1 is an explanatory figure schematically showing a granule manufacturing apparatus relating to the present invention.

A granule manufacturing apparatus of the invention, as shown in FIG. 1, includes, as major components thereof, an apparatus body 2 having a granulating chamber 1, a spray nozzle 4 (simply "nozzle" hereinafter) disposed at a lower region of the apparatus body 2 for spraying liquid material 3 into the granulating chamber 1, and an air blowoff portion 5 disposed downwardly of the nozzle 4 for feeding fluidizing air 6 so as to form a fluidizing layer R of granules inside the granulating chamber 1.

With the granule manufacturing apparatus of this invention, the air 6 is blown or discharged from the air blowoff portion 5 upwardly into the granulating chamber 1. The liquid material 3 is sprayed from the nozzle 4 also upwardly into the air 6. Sprayed droplets of the liquid material 3 will float and flow inside the granulating chamber 1. Then, moisture contained in the liquid material 3 will be evaporated, so that the droplets will be dried and solidified to form fine primary particles. These primary particles will be coated repeatedly and intermittently with additional liquid material 3 sprayed subsequently from the nozzle 4 to grow in their particle sizes, whereby granules having a predetermined particle diameter are manufactured.

Next, the individual components constituting the granule manufacturing apparatus of the invention will be described <Apparatus Body>

As shown in FIG. 1, the granule manufacturing apparatus of the invention includes the generally cylindrical apparatus body 2. This apparatus body 2 includes at substantially center thereof the granulating chamber 1 for forming granules. This apparatus body 2 has a dividable construction so that the body can be opened/closed at a predetermined position along the vertical direction X, so as to e.g. facilitate maintenance operation of the nozzle 4 or of the air blowoff portion 5.

In the instant embodiment, the granulating chamber 1 includes a generally conical wall portion 15. In general, the liquid material 3 sprayed and fed into the granulating chamber 1 tends to be dispersed more as it flows and flows upward. Then, by providing the generally conical wall portion 15 as in this construction, this arrangement serves to reduce opportunity for the primary particles floating upward to adhere to the wall portion 15. As a result, mutual coagulation of the primary particles or sprayed droplets may be further restricted and their floating/flowing period may be extended, so that the primary particles or the like may be dried and solidified more reliably.

The slope angle of the wall portion 15 may be appropriately set, depending on the spraying angle of the liquid material 3 from the nozzle 4. For instance, assuming a conical plane including the wall portion 15, the spray opening of the nozzle 4 may be located at the top of the cone. With this construction, the spraying direction of the liquid material 3 from the nozzle 4 agrees with the extending direction of the wall portion 15. Thus, the possibility of adherence of the liquid material 3 to the wall portion 15 may be reduced.

Incidentally, the portion of the apparatus body 2 located on the side of the nozzle 4 is formed, allowing circulation of the fluidizing air 6. Accordingly, dispersion of the liquid material 3 sprayed from the nozzle 4 is restricted to some extent by the air 6. Considering this respect, the slope of the conical face may be closer to vertical than the one described above. For instance, assuming a conical plane including the wall portion 15, the slope may be set so that the spray opening of the nozzle 4 may be located inwardly of the cone.

At the upper region of the apparatus body 2, there are provided an air exhaust port 7 and an exhauster 8 for exhausting the air inside the granulating chamber 1.

On the other hand, at the lower region of the apparatus body 2, there are provided an air feed port 9 and a blower 10 for feeding air into the granulating chamber 1 and an air heater 11.

<Nozzle>

The nozzle 4 for spraying the liquid material 3 is disposed e.g. at a lower region of the granulating chamber 1.

The liquid material 3 may be e.g. slurry of sodium nitrate, sodium acetate, or titanium oxide, slurry of ceramic powder, slurry of medical substance (ethenzamide probenecid, etc.), water solution for various food products, such as water solution of cocoa, water of coffee, etc.

Incidentally, the liquid material 3 may be mixed with various binders for promoting adhesion of respective granules.

The liquid material 3 is sprayed by the nozzle 4 toward the upper region of the granulating chamber 1.

The liquid material 3 is drawn from a material vessel 13 by means of a material feed pump 12 to be supplied to the nozzle 4. In the course of this, the nozzle 4 is supplied with air for spraying from an air compressor 14. Incidentally, the liquid material 3 and the air 4 are supplied via e.g. a double pipe to the nozzle 4, which mixes them and sprays the liquid material 3 mixed with the air. With this spraying, fine droplets of the liquid material 3 will be effectively blown upward into the granulating chamber 1 and the droplets float and flow inside the granulating chamber 1 to be dried and solidified.

<Air Blowoff Portion>

Figure 2:
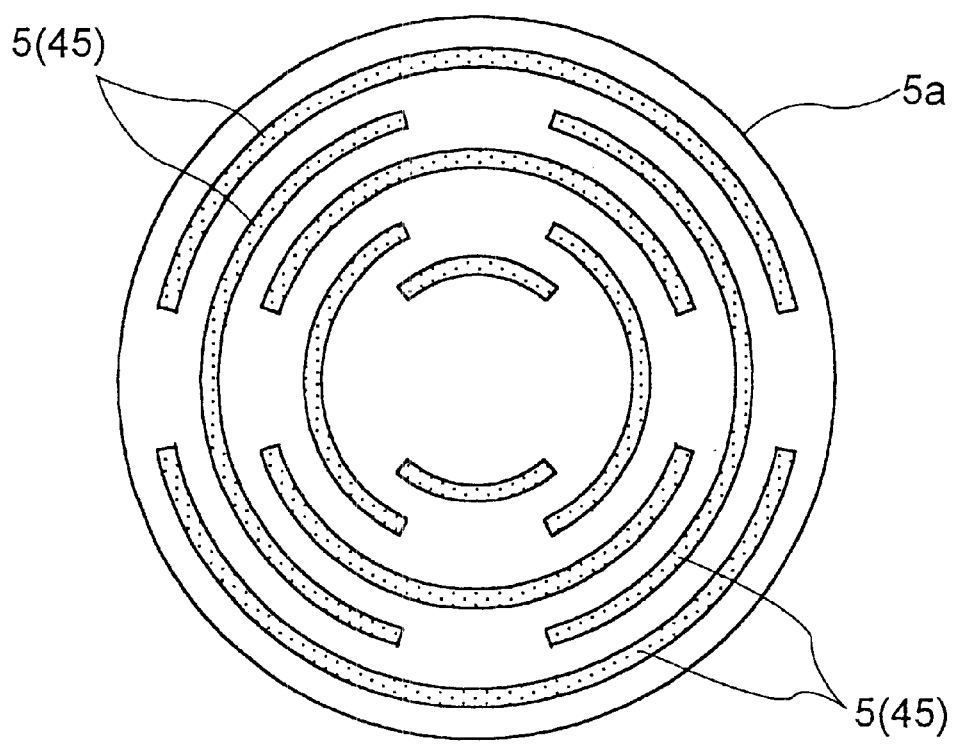
FIG. 2 is a plan view of an air blowoff member.

The air blowoff portion 5 supplies upward the fluidizing air 6 which has been adjusted to a predetermined temperature and moisture content. These temperature and moisture content are determined mainly by using a thermometer 16 and a hygrometer 17 attached to the wall portion 15 of the granulating chamber 1. A plan view of the air blowoff portion 5 is shown in FIG. 2. The air blowoff portion 5 is disposed at a lower region of the granulating chamber 1. For instance, a disc-like air blowoff member 5a thereof may be a punching plate or a stainless sintered plate. Also, the portion may include a porous ceramic or filter material for providing a number of apertures and may be disposed at the lower region of the granulating chamber 1.

Incidentally, for forming the air blowoff portion 5, it is not absolutely necessary to employ the air blowoff member 5a in the form of a disc. For instance, the air blowoff portion 5 may be formed by using the above-described stainless sintered plate. Specifically, it is possible to employ a mesh-like member which is formed by intertwining fine stainless wires and then sintering and molding them together. This material is superior in heat resistance, corrosion resistance and strength. Hence, the durability of the manufacturing apparatus may be improved, allowing wider selection of its operation conditions to be set for granulation.

The pressure of the air should preferably be such that it may cause the individual granules to float and flow inside the granulating chamber 1. Especially, at the initial stage of the granulation process, in order to avoid mutual coagulation of the primary particles, the discharge amount of the air will be adjusted to ensure that the primary particles will float and flow incessantly inside the apparatus body 2.

Further, the temperature and moisture content of the air should be adjusted appropriately, depending on the degree of dryness of the primary particles or sprayed droplets. This is because, for instance, if the drying of the primary particles is slow, mutual coagulation of the primary particles tends to occur, causing such inconvenience as widening of the size distribution of the resultant granules.

The discharging of the air is effected generally upward. But, this direction may be upward along the vertical direction X. Alternatively, it may be discharged obliquely upward so as to form a swirling current of the air inside the granulating chamber 1. When such swirling current is formed, this will more positively lift up the granules in the course of their manufacture, so that drying and solidification of the granules may be further promoted.

<Manufacturing Process>

An example of the process of manufacturing granules having a predetermined particle diameter using the manufacturing apparatus of the invention is illustrated in FIGS. 3–5. FIG. 3 illustrates an initial stage of granulation for forming the primary particles as seeds. FIG. 4 illustrates an intermediate stage of granulation in which additional liquid material 3 is caused to adhere to the granules being manufactured. FIG. 5 illustrates a final stage of granulation in which further additional liquid material 3 is caused to adhere to the granules at the latter stage of manufacturing process.

As illustrated in FIG. 3, first, a predetermined amount of fluidizing air 6 is discharged in advance from the air blowoff portion 5, and into this air flow, the liquid material 3 is sprayed from the nozzle 4. The air 6 has been adjusted to a predetermined temperature by means of the air heater 11. Then, as described hereinbefore, at the initial stage of granulation, a group of fine particles comprising the primary particles or granules are produced.

FIG. 4 illustrates the intermediate stage of manufacturing process. In this condition, those granules which have grown in particle diameters with certain degree of progress of granulation are floating and moving at the lower region of the granulating chamber 1. Whereas, the smaller granules which have not grown to such degree are floating and moving at the upper region of the granulating chamber 1. These small granules will adhere to the surfaces of the grown granules present at the lower region of the granulating chamber and will catch sprayed droplets of additional liquid material 3 supplied subsequently. As a result, substantially all of the granules will have a same particle diameter. By effecting this process in repetition, granules having a predetermined particle diameter may be obtained.

FIG. 5 illustrates the final stage of the manufacturing process. At this stage, most of the granules have grown approximately to the target particle diameter. Spraying of the liquid material 3 at this final stage is effected for causing all of the sprayed material to adhere to the granules. Since most of the granules are floating and moving at the lower region of the granulating chamber 1, the sprayed liquid material 3 may be reliably adhered to the granules moving in the vicinity of the nozzle 4.

Upon completion of the granulation, the granules may be taken out appropriately from a product outlet 19 by operating an opening/dosing lid 18.

As described above, according to the invention's granule manufacturing apparatus for upwardly spraying the liquid material 3 and causing the primary particles or the like to float and flow over a wide area, granules are grown while restricting mutual coagulation of the granules. Hence, it is possible to obtain granules having any desired particle diameter. Moreover, the obtained granules have only very small particle size variations.

Also, at the start of the granulation process, it is not necessary to charge raw material particles as seeds into the granulating chamber 1. The granules may be manufactured only by spraying of the liquid material 3. Accordingly, the manufacturing efficiency of granules may be improved significantly.

Second Embodiment

Figure 6:
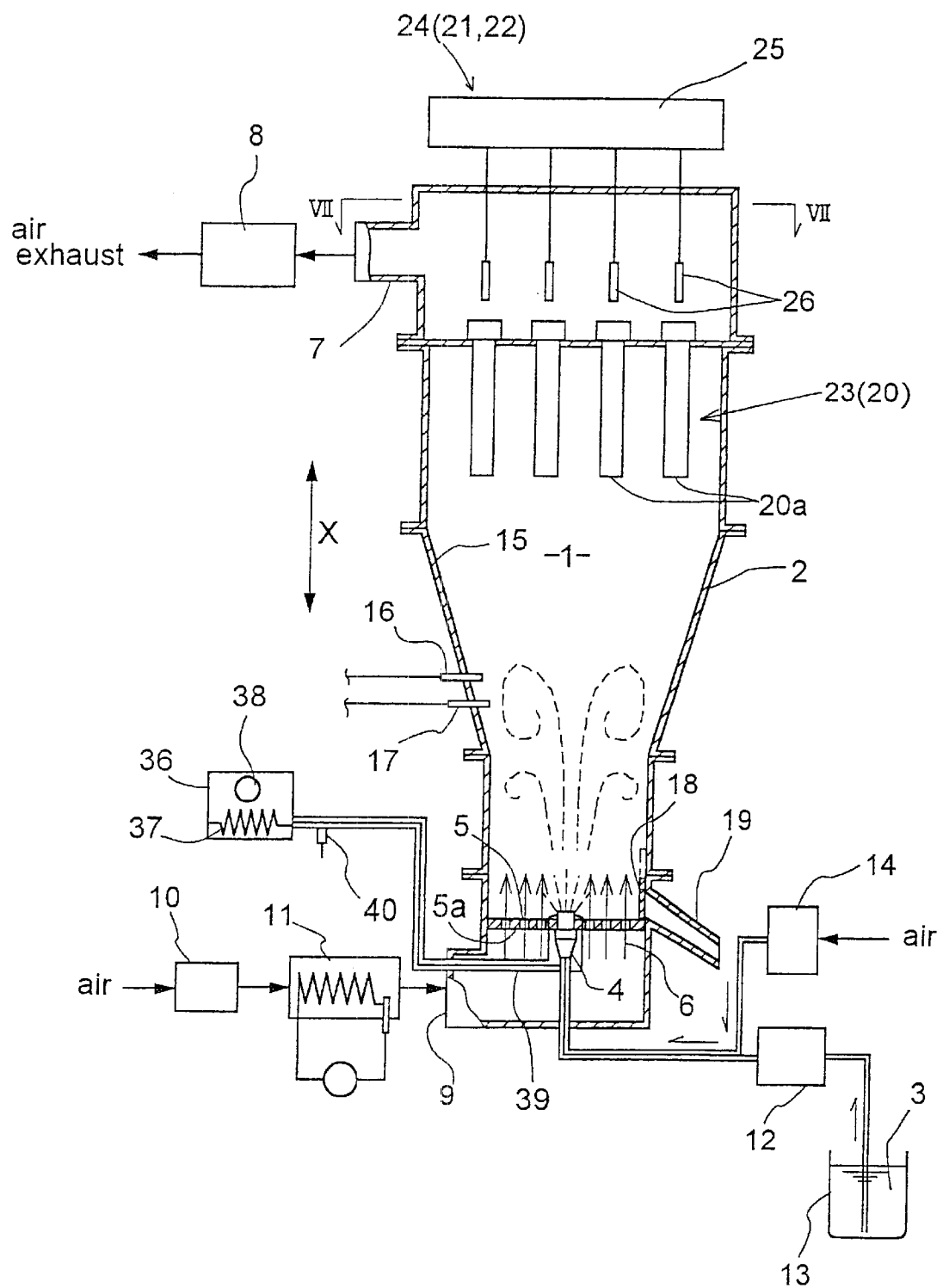
FIG. 6 is an explanatory figure schematically showing a granule manufacturing apparatus relating to a second embodiment.

FIG. 6 schematically shows a manufacturing apparatus relating to the second embodiment. This apparatus, relative to the apparatus shown in FIG. 1, additionally includes a filter 20, a sweep-off means 21 for sweeping off granules under granulation adhering to the filter 20 and a pressure applying means 22 for momentarily increasing the pressure inside the granulating chamber 1.

<Filter>

The filter 20 is disposed at the upper region of the granulating chamber 1 so as to prevent fine granules under granulation from being exhausted when the air inside the granulating chamber 1 is exhausted.

Inside the granulating chamber 1, there is a constant upward flow of the fluidizing air 6, so that the granules floating inside the granulating chamber 1 tend to move toward the air exhaust port 7.

Then, by providing the filter 20 as proposed by this construction, it is possible to prevent a portion of the floating granules from being inadvertently discharged through the air exhaust port 7, so that the yield of the liquid material 3 used in the granulation may be improved.

<Sweep-off Means>

The sweep-off means 21 is provided for sweeping off small granules adhered to the filter 20 and dried thereon and then causing them to float and move again inside the granulating chamber 1. With this sweep-off means 21, it is possible to surely cause the granules under granulation to float and move inside the granulating chamber 1, thus promoting growth of the granules.

This sweep-off mans 21 may be various types, such as one for vibrating the filter 20 or applying back pressure to the filter 20.

<Pressure Applying Means>

The pressure applying means 22 is provided for increasing the internal pressure of the granulating chamber 1 by predetermined intervals. With this operation, it is possible to compact the granules under granulation by the pressure applied thereto, so that especially heavy and dense granules may be obtained.

<Bag Filter>

In this second embodiment, a bag filter 23 having a backwashing unit 24 is employed for providing the functions of the filter 20, the sweep-off means 21 and the pressure applying means 22. As shown in FIG. 6, the bag filter 23 is disposed at the upper region of the granulating chamber 1.

This bag filter 23 includes a plurality of generally cylindrical filter bodies 20a each having dimensions of 89 mm φ×900 mm. Namely, the filter bodies 20a prevent exhaust of fine granules and the granules under granulation are dried.

Figure 7:
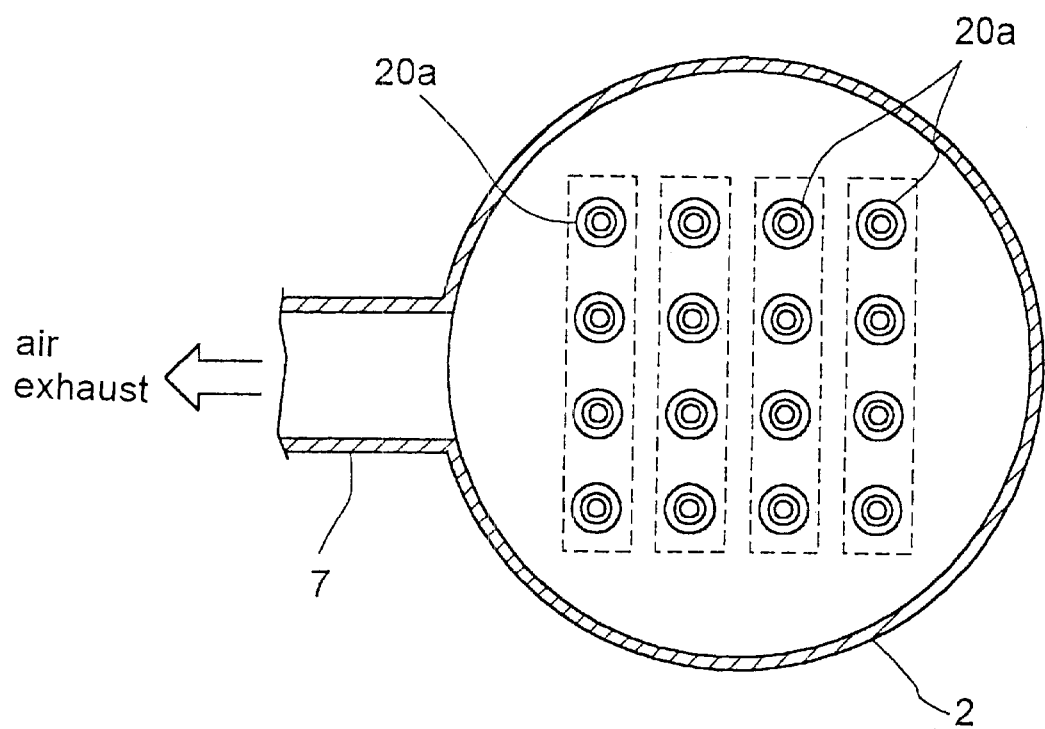
FIG. 7 is an explanatory figure showing an arrangement of a bag filter relating to the second embodiment.

The filter bodies 20a are arranged, for example, in a matrix of 4 columns×4 rows as shown in FIG. 7. FIG. 7 is a view taken at a position VII—VII in FIG. 6. This bag filter 23 is capable of collecting particles of several $\mu$m.

Therefore, even if the supply amount of air from the air blowoff portion 5 becomes too large, the granules under granulation will not be discharged inadvertently to the outside of the apparatus body 2.

With this provision of the bag filter 23, the granules under granulation may be collected and dried in a reliable manner.

The backwashing unit 24 includes a pressure-air source 25 connected to a compressor (not shown) disposed outside the apparatus body 2 and a blow tube 26 attached to the vicinity of the respective filter bodies 20a. As this backwashing unit 24 applies momentary pressure to the filter bodies 20a from the side of the air exhaust port 7 toward the granulating chamber 1, granules adhering to the bag filter 23 are sweeped off. As indicated by broken lines in FIG. 7, in this embodiment, of the total sixteen filter bodies 20a, each four of them in a row are treated as a group, and respective groups are backwashed one after another. By applying momentarily high-pressure air in the reverse direction to each group by predetermined time interval, fine granules adhered to and dried on the filter bodies 20a are caused to again float and flow inside the granulating chamber 1.

Though not shown, the pressure air source 25 includes e.g. a timer for setting the time interval for application of the backwashing air pressure or backwashing operation.

As described above, by providing the bag filter 23, it is possible to prevent almost entirely inadvertent discharge of fine granules from the granulating chamber 1. Further, since the discharge of fine granules is prevented and the drying of these granules is effected reliably, it is possible to reduce the capacity of the granulating chamber 1. As a result, the construction of the manufacturing apparatus may be very compact.

<Nozzle>

Further, the manufacturing apparatus relating to this second embodiment is constructed also that the nozzle can be temperature-adjustable in order to optimize the spraying condition of the liquid material 3.

Figure 8:
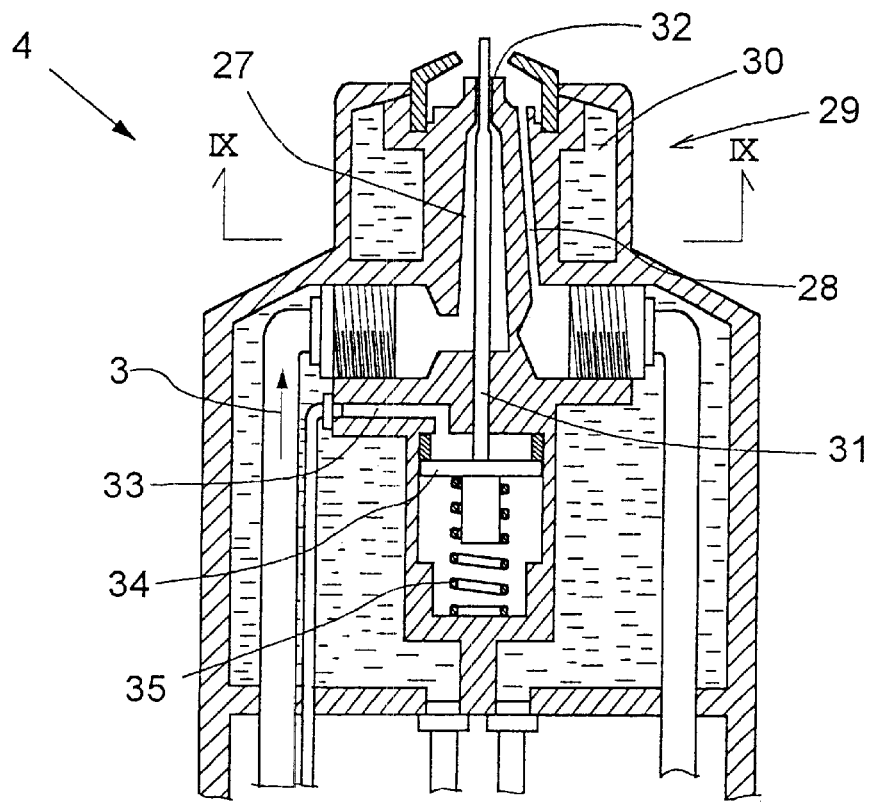
FIG. 8 is a vertical section of a nozzle of the manufacturing apparatus relating to the second embodiment.

As shown in FIG. 8, this nozzle 4 has a triple construction. Namely, the innermost space thereof is a liquid feed passage 27 for feeding the liquid material 3. The next space outwardly of the innermost space is a pressure-air feed passage 28 for feeding the compressed air for spraying. The outermost space is a jacket 29 forming a temperature-adjusting passage 30 allowing passage of fluid therein for the temperature adjustment of the nozzle 4. The liquid material 3 and the compressed air are merged together at the leading end of the nozzle 4. Then, fine droplets of the liquid material 3 will be positively sprayed upwards into the granulating chamber 1 and as they flow inside the granulating chamber 1, they are dried and solidified.

Examples of the liquid material 3 sprayed by the nozzle 4 for which the nozzle 4 needs to be maintained at an elevated temperature are thermosoftening resin solution or sugar ester which are softened when heated and detergent or flavor solution which lose viscosity when heated.

On the other hand, examples of the liquid material 3 which require that the nozzle 4 be maintained at a low temperature are thermosetting resin solution which is hardened when heated and coffee extract of juice which loses its original flavor if heated. Further examples are slurry of organic salts which deteriorate if heated or of ceramic powder which can be easily evaporated and materials which make their supply difficult or deteriorate in their quality if heated.

Incidentally, the liquid material 3 may be mixed in advance with various binders in order to promote mutual adhesion of granules under granulation.

These kinds of liquid material 3 are sprayed upwards by the nozzle 4 toward the upper region of the granulating chamber 1. As shown in FIG. 6, the liquid material 3 is drawn from the material vessel 13 by means of the material feed pump 12 and fed to the nozzle 4. In the course of this, the nozzle 4 is supplied also with the compressed air for spraying from the air compressor 14.

As shown in FIG. 8, the liquid feed passage 27 incorporates therein a bar-like needle 31. The leading end of this needle 31 can be freely inserted into and retracted from a liquid-material spray opening 32. That is, when the liquid material 3 is to be sprayed, the needle is retracted away from the liquid-material spray opening to open up this spray opening. When the liquid material 3 is not to be sprayed, the needle is inserted into the liquid-material spray opening 32 to dose this spray opening. 32.

These operations are effected by supplying operating pressure air to a needle air feed passage 33 provided beside the nozzle 4. Specifically, by supplying the pressure air also to the needle air feed passage 33 in association with the pressure air supplied to the pressure air feed passage 28, a pressure is applied to a flange portion 34 provided at the base end of the needle 31. With this, the needle 31 is pushed down against an urging force of a spring 35 provided on the back side of the flange portion 34. As a result, the liquid material spray opening 32 is opened up to spray the liquid material 3. When the supply of pressure air to the needle air feed passage 34 is stopped, the spring pushes back the needle 31 to close the liquid material spray opening 32 again.

Incidentally, when the needle 31 doses the liquid material spray opening 32, the leading end of the needle 31 projects from this liquid material spray opening 32. That is to say, the liquid material spray opening 32 is exposed inside the granulating chamber 1 to be exposed to the fluidizing air 6. Therefore, of the liquid material 3 present inside the nozzle 4, in particular, a portion of the material 3 located adjacent the liquid spray opening 32 tends to be dried and solidified easily. If it is solidified, this will lead to abnormality in the opening area or shape of the liquid spray opening, thus resulting in change in the spraying condition of the liquid material 3, consequently, non-uniformity in the particle diameter of the sprayed droplets. As a result, it becomes difficult to obtain granules of uniform particle size. Therefore, by providing the needle 31 movable into and out of the liquid spray opening 32, even if the liquid material 3 begins to solidify at the liquid spray opening 32, the solids if formed may be removed always by the needle 31. So that, the liquid spray opening 32 may be maintained under a clean condition, thus making it possible for the manufacturing apparatus to be continuously operated for a long period of time, thus further improving the manufacturing efficiency of the granules.

As shown in FIG. 8, with this granule manufacturing apparatus of the invention, the nozzle 4 is provided with the jacket 29. This jacket 29 forms the temperature-adjusting passage 30 for adjusting the temperature of the nozzle 4. By circulating fluid in this temperature-adjusting passage 30, the temperature of the jacket 29 is adjusted for optimizing the temperature of the liquid material 3 to be sprayed and supplied. For this reason, the jacket 29 is provided over substantially entire outer periphery of the nozzle 4.

In this jacket 29, water as an example of the fluid is circulated. This water is recycled back to the temperature-adjusting passage 30 by using a circulation unit 36. Needless to say, other kinds of fluids than water can be used if desired.

The circulation unit 36 includes a temperature adjusting mechanism 37 having e.g. a temperature setting knob 38. By operating this knob, the temperature of the water can be set to a predetermined value. A circulation passage 39 for circulating water incorporates, at a certain position thereof, a water temperature gauge 40 for detecting the water temperature. Then, based on a detection value of this water temperature gauge 40 and the set value on the temperature setting knob 38, the temperature adjusting mechanism 37 is operated automatically.

Figure 9:
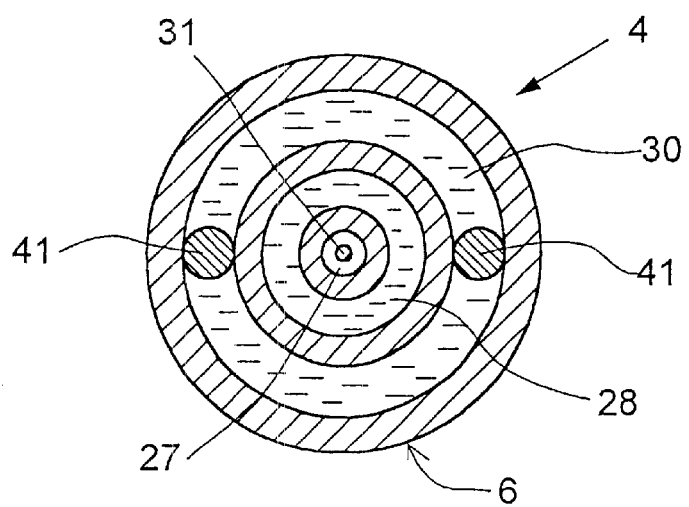
FIG. 9 is a plan view in section showing the nozzle of the manufacturing apparatus relating to the second embodiment.

FIG. 9 is a section taken long IX—IX in FIG. 8. As shown in FIG. 9, the temperature adjusting passage 30 incorporates therein partitioning elements 41 for causing water to flow in one direction relative to the inside of the temperature adjusting passage 30. That is to say, by providing these partitioning elements 41, it is possible to allow water inside the temperature adjusting passage 30 to flow smoothly and uninterruptedly, thus improving the heating/cooling efficiency of the nozzle 4.

As described above, by providing the jacket 29, it is possible to optimize the temperature of the liquid material 3 to be sprayed and supplied. Solidification or deterioration of the liquid material 3 within the nozzle 4 may be prevented and the continuous operation of the manufacturing apparatus may be facilitated. Further, with optimization of the temperature of the liquid material 3, the viscosity of the liquid material. 3 may be made suitable for spraying. The particle diameter of the sprayed droplets or the like may be made uniform and the growth rate of the granules may be made uniform, so that quality granules having uniform size distribution may be obtained.

<Manufacturing Process>

An example of the process of manufacturing granules having a predetermined particle diameter using the manufacturing apparatus relating to the second embodiment is illustrated in FIGS. 10–12. FIG. 10 illustrates an initial stage of granulation for forming the primary particles as seeds. FIG. 11 illustrates an intermediate stage of granulation in which while the primary particles are being formed as seeds, additional liquid material 3 is caused to adhere to the primary particles or the granules being manufactured. FIG. 12 illustrates a final stage of granulation in which further additional liquid material 3 is caused to adhere to the granules at the latter stage of manufacturing process.

A predetermined amount of fluidizing air 6 is discharged in advance from the air blowoff portion 5, and into this air flow, the liquid material 3 is sprayed from the nozzle 4. The air 6 has been adjusted to a predetermined temperature by means of the air heater 11.

In the course of the above, the strength of the air 6 supplied from the air blowoff portion 5 is set such that as many as possible sprayed droplets or primary particles may float and flow inside the granulating chamber 1. In this case also, i.e. when the primary particles are caused to float positively inside the granulating chamber 1, since the bag filter 23 is provided at an upper region of the granulating chamber 1, the primary particles or granules which have gained in particle diameters to some extent will not be discharged inadvertently to the outside of the apparatus body 2.

Incidentally, when the bag filter 23 is sweeped off, the fine granules will be dropped in a dispersed state. Hence, a large distance may be obtained between the granules. Therefore, compared with a case in which the liquid material 3 is sprayed downwards, it is possible to set the concentration of the liquid material 3 high. This advantage of being able to increase the concentration can be obtained not only at the initial stage of granulation, but also at a subsequent sage when the growth of granules has advanced to some extent.

In particular, at such stage when the growth of granules has advanced to some extent to form granules of larger diameters, the concentration of the liquid material 3 may be further increased. This is because the mass of the granules too increases, so that coagulation of granules can be restricted even when a surface tension of the liquid or force of inter-molecule attraction is applied thereto. As a result, a correspondingly larger amount of liquid material 3 may be sprayed, so that the growth of the granules can be positively accelerated.

The primary particles or granules collected by the bag filter 23 at the initial stage of granulation substantially complete their drying on the bag filter 23. And, as these granules adhering to the bag filter 23 have become lighter since moisture or the like contained within the granules has substantially evaporated. Thus, mutual coagulation among these granules will hardly occur.

FIG. 11 illustrates the intermediate stage of manufacturing process. The granules which have completed their drying on the bag filter 23 will be sweeped off by the backwashing unit 24 provided to the bag filter 23 back into the granulating chamber 1. And, these sweeped-off granules will again float and flow inside the granulating chamber 1. And, when they float and flow to the vicinity of the nozzle 4, the liquid material 3 is sprayed again onto them from the nozzle 4. These granules coated with the liquid material 3 will be dried while floating and flowing inside the granulating chamber 1 and will be adsorbed to the bag filter 23. With repetition of these stages, granules having a predetermined particle diameter will be produced.

At this intermediate stage, those granules which have grown in particle diameters with certain degree of progress of granulation are floating and moving at the lower region of the granulating chamber 1. Whereas, the smaller granules which have not grown to such degree are floating and moving at the upper region of the granulating chamber 1. These small granules will adhere to the surfaces of the grown granules present or the small granules coagulate each other and grow. So that, with lapse of time, substantially all of the granules will obtain a uniform particle diameter.

With the granulating system relating to the second embodiment, while the spraying of the liquid material 3 is carried out, the backwashing unit 24 is operated to sweep off the granules adhered to the bag filter 23. As this backwashing unit 24 has the function of the pressure applying means 22, the internal pressure of the granulating chamber 1 is increased periodically.

With such periodical increase of the pressure of the granulating chamber 1, the fine particles adhered to the surfaces of the somewhat grown granules may be compacted on these surfaces. If the pressure applying means 22 is not operated, the liquid material 3 sprayed from the nozzle 4 will only adhere to the peripheries of the granules by means of e.g. the surface tension. And, when this adhered liquid material 3 is dried, the individual portions of the material will be jointed only by means of the adhesive force of binder or the like contained in the liquid material 3.

In contrast, when the backwashing unit 24 is operated to increase intermittently the pressure around the granules, a fixed pressure will be applied to each granule from all directions. Consequently, the respective fine granules will be pressed against each other to be joined firmly, so that heavy granules are formed. In this case, the density of the resultant granules will show the largest value of granules formed by a manufacturing apparatus of this type.

As described above, as granules having a high density are formed, mutual coagulation among those granules having grown to some extent will occur even less, so that granules having a uniform particle size may be manufactured as a whole.

Further, during the manufacturing process, the individual granules will collide frequently against the wall portion 15 of the granulating chamber 1 and the air blowoff member 5a, etc. So that, the shapes of the granules will be rendered uniform and substantially spherical granules may be obtained.

In addition to the above, since the granules during manufacture thereof grow while being compacted, the strength of the granule during the manufacture is extremely high. Thus, it is possible to obtain hardly breakable granules during the manufacture or when they are completed as products.

Of the floating and flowing granules, those which have substantially finished growing and gained in mass will float and flow at the lower region of the granulating chamber 1. These granules having substantially finished growing may be extracted from the product outlet 19 provided at a lower portion of the granulating chamber 1. This extracting operation may be carried out in substantially same manner as that described hereinbefore in the first embodiment.

FIG. 12 illustrates the final stage of the manufacturing process. At this stage, most of the granules have grown approximately to the target particle diameter. The flowing condition of the granules, the spraying condition of the liquid material 3 , etc. at this stage are substantially same as those of the first embodiment described hereinbefore.

As described above, according to the manufacturing apparatus of the second embodiment, mutual coagulation among the primary particles or the granules at the respective stage of the manufacturing process is effectively restricted. Thus, granules having a desired particle diameter may be obtained.

Further, with this manufacturing apparatus, as the granules are grown with the operation of the pressure applying means 22, the granules are particularly compacted during the manufacture, so that heavy, large and strong granules having a high bulk density may be obtained.

Moreover, since such heavy granules are obtained, each of the granules colliding against the wall portion 15 of the granulating chamber 1 during the manufacturing process will be subjected to the pressure evenly from around. As a result, substantially spherical granules may be obtained.

<Example>

Next, there will be described an example in which granules of lactic add were manufactured by using the manufacturing apparatus according to the second embodiment.

The granulating chamber 1 had a diameter of 350 mm and a floor area of 0.096 $m^2$. The liquid material 3 comprised 50% water solution of lactic acid.

From the air blowoff portion 5, air of about 100° C. was blown off at the rate of 7.54 $Nm^3$/min. From the nozzle 4, the lactic add solution was sprayed with using air having a spraying air amount of 170 l/min and a spraying air pressure of 5 kg/$mc^2$.

The backwashing of the bag filter 23 was effected every 7 seconds for each group consisting of 4 filter bodies one after another. The pressure of this backwashing was 6 kgf/$cm^2$.

The air exhaust condition from the air exhaust port 7 is determined substantially by the spraying amount of the liquid from the nozzle 4. In the case of this example, with the spraying under the above-described conditions, the exhaust air temperature was 35° C. and its relative humidity was 60%.

By operating the manufacturing apparatus under the above-described conditions for 200 minutes, a total amount of 31.5 kg of granules was obtained.

The particle size distribution of the resultant granules was narrow, compared with the particle size distribution of granules obtained by using the conventional apparatus, i.e. the apparatus without the pressure applying means 22 and operating with spraying the lactic add solution downwards.

Table 1 below show the bulk densities of the granules obtained by the granule manufacturing apparatus of the invention.

TABLE 1

| operating time (min) | 50 | 100 | 150 | 200 |
|---|---|---|---|---|
| bulk density (g/cc) | 0.68 | 0.71 | 0.73 | 0.77 |
| average particle diameter ($\mu$/m) | 300 | 400 | 480 | 560 |

As apparent from Table 1, the longer the operating time, the higher the bulk density of the resultant granules. That is to say, with this manufacturing apparatus, there was achieved the effect of compacting the granules during the manufacture process, so that heavy granules were formed.

On the other hand, Table 2 below shows the influence of the backwashing operation on the bulk density of the granules. The bulk density values were those obtained after the manufacturing apparatus was operated for 200 minutes.

TABLE 2

| backwashing interval (sec) | 7 | 14 | 20 |
|---|---|---|---|
| bulk density (g/cc) | 0.82 | 0.79 | 0.76 |

As may be apparent from the above results, the shorter the interval of backwashing operation, the higher the bulk density of the granules. Hence, it may be understood that the pressure applying means provides the compacting effect on the granules.

Incidentally, the nozzle 4 disclosed in this second embodiment can be employed not only in the manufacturing apparatus of this embodiment, but may be employed in the manufacturing apparatuses of all of the embodiments of the invention disclosed herein.

Third Embodiment

Figure 13:
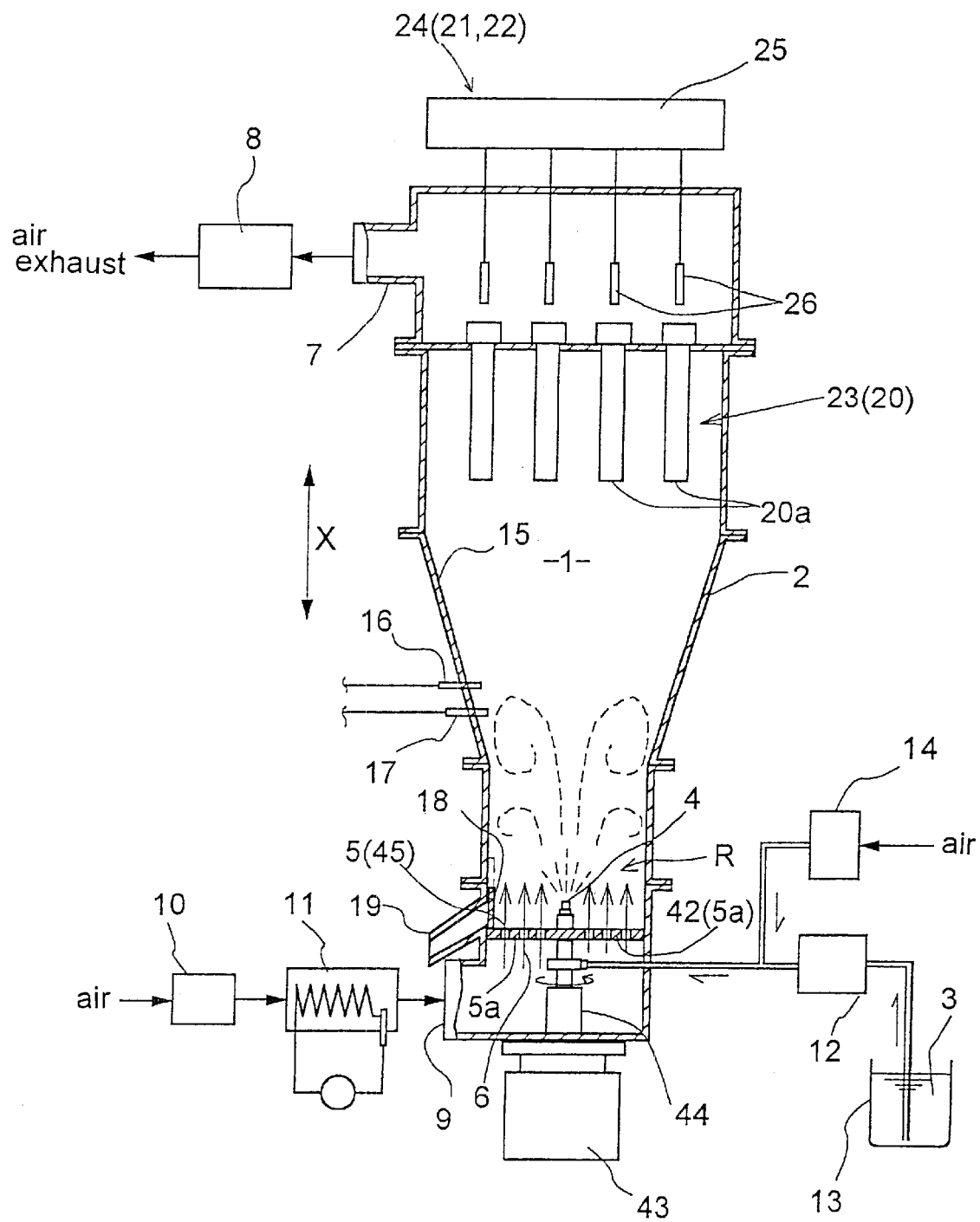
FIG. 13 is an explanatory view schematically showing a manufacturing apparatus relating to a third embodiment.

The granule manufacturing apparatus of the invention, as shown in FIG. 13, may include a rotor 42 disposed at the bottom of the granulating chamber 1. This rotor 42 provides the function of blowing off air 6 into the granulating chamber 1. Also, this rotor 42 provides another function of causing accumulated granules under manufacture to roll and applying an external force to the granules for compacting them to finish them into spherical shape.

This rotor 42 can be formed of e.g. a plate-like member having a plan shape as shown in FIG. 2 for example. And, this rotor is rotatably driven by means of a motor 43 disposed below about a shaft 44 along the vertical direction X. The rotational speed of the rotor 42 can be varied appropriately by controlling the motor 43.

The rotor 42 defines a plurality of arcuate slits 45 like those shown in FIG. 2 described hereinbefore. In these slots 45, those located close to the outer periphery have longer total lengths, whereby the air supply amount may increase on the outer side of the rotor 42. This is because, especially when the rotor 42 is rotated, the granules are scattered to the outer side of the rotor 42 thereby to increase of the amount of the granules accumulated on the outer periphery of the rotor 42, so that a greater amount of air 6 needs to be blown off at this portion.

Incidentally, in addition to the conventional porous plate such as a punching plate, the rotor 42 may employ also a conventional porous material. Further, if needed, a stirrer such as a stirrer blade may be additionally provided.

Hence, with the provision of the rotor 42, in addition to the compacting effect provided by the pressure applying means 22, a further compacting effect due to the rolling movement can also be expected, whereby heavier and firmer granules may be obtained.

Moreover, by rolling the granules by the rotor 42, globurizing of the granules may be further promoted.

In addition, by providing the rotor 42, it becomes possible to manufacture larger granules which could not be blown up by the air 6 from the air blowoff portion 5. Such large granules will be accumulated on the rotor 42. However, as the rotor 42 is being rotated, this will constantly roll the granules, so that the liquid material 3 sprayed from the nozzle 4 may be applied to the surfaces of the granules in an uniform manner.

Fourth Embodiment

Figure 14:
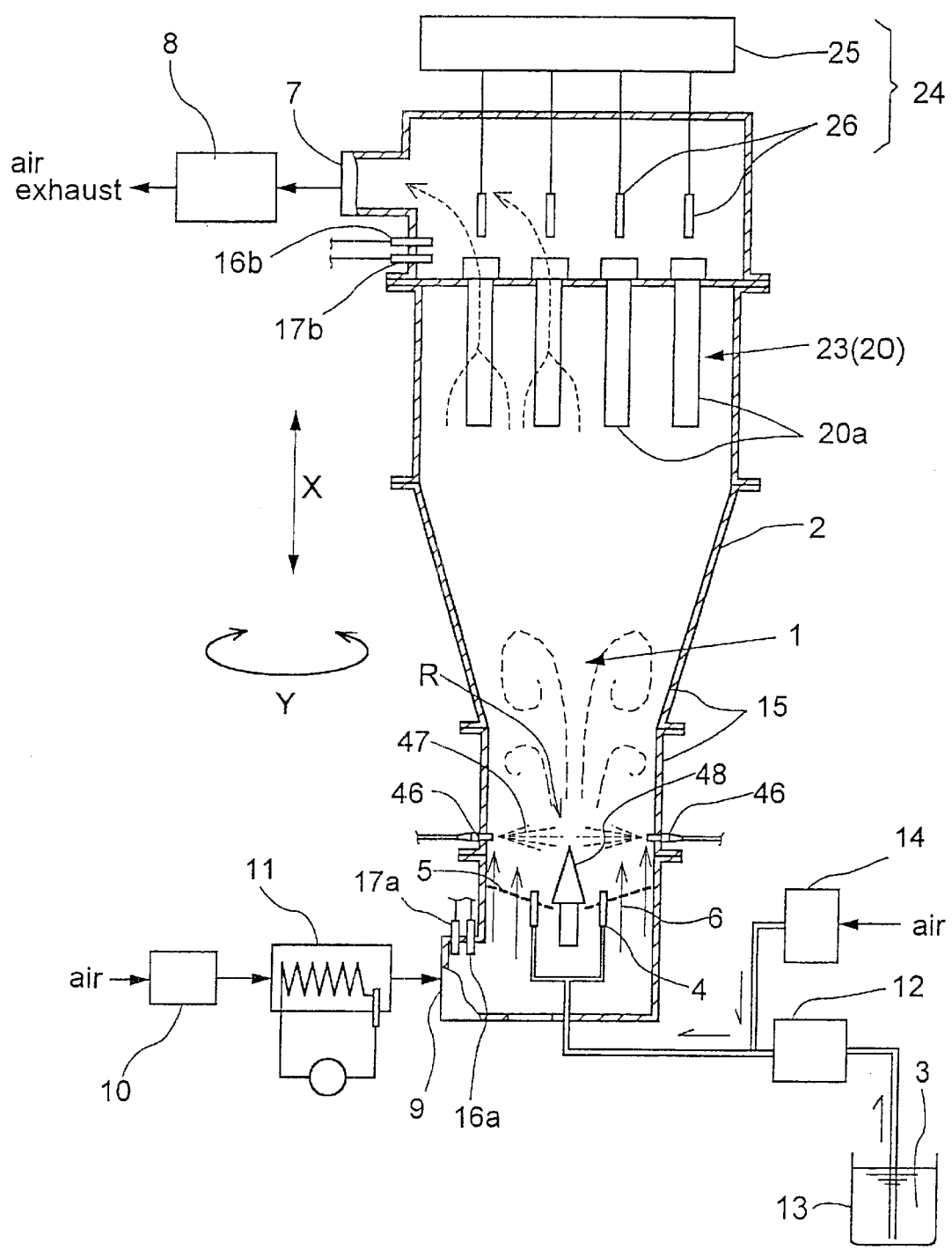
FIG. 14 is a vertical section showing a manufacturing apparatus relating to a fourth embodiment.

A further embodiment of a manufacturing apparatus relating to the present invention is illustrated in FIG. 14.

This manufacturing apparatus is characterized in that the apparatus includes jet nozzles 46 for jetting high-pressure air to a lower region of the granulating chamber 1. The remaining basic construction of the apparatus is same as that of the manufacturing apparatuses of the above-described respective embodiments. By using this manufacturing apparatus, it is possible to obtain granules of particularly high quality. The resultant granules are often employed as a pharmaceutical product. The tablets formed by compressing the granules can be dissolved speedily after administration thereof. Hence, these are particularly suitable as a pharmaceutical product to be aspirated from the nasal cavity, for instance.

The jet nozzle 46 is provided to the wall portion 15 of the apparatus body 2. In the case of this embodiment, the pulse jet 47 is jetted from the respective jet nozzle 46. This pulse jet 47 comprises intermittent jetting of dry compression air.

Figure 15:
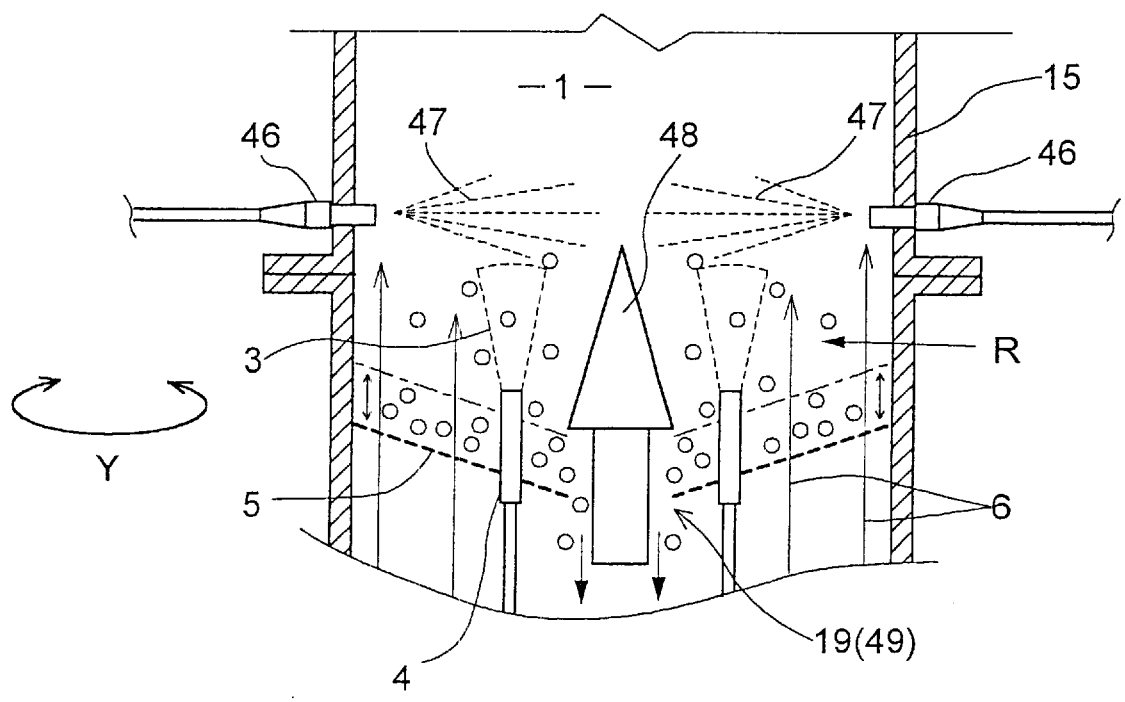
FIG. 15 is a vertical section showing principal portions of the manufacturing apparatus relating to the fourth embodiment.
Figure 16:
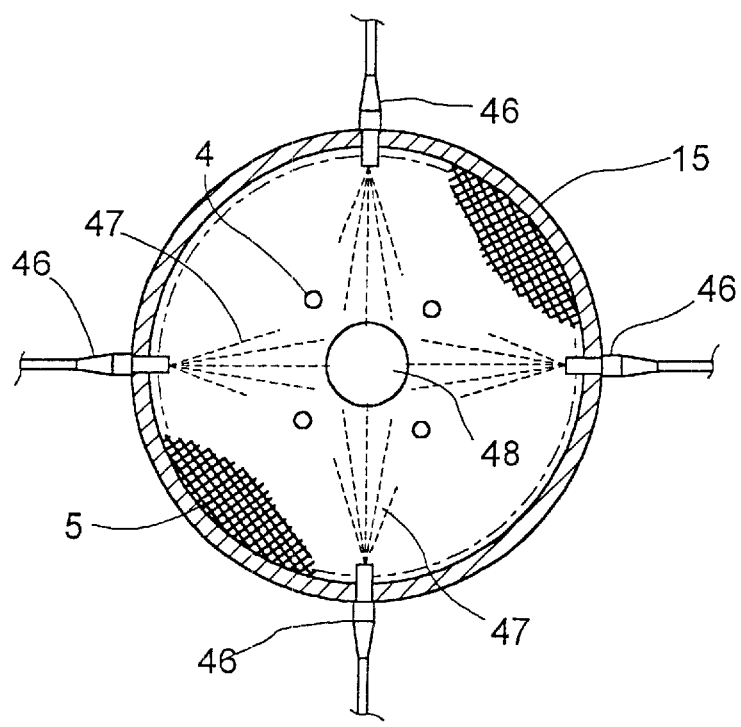
FIG. 16 is a plan view in section showing principal portions of the manufacturing apparatus relating to the fourth embodiment.

FIGS. 15 and 16 illustrate an example in which four jet nozzles 46 are distributed along the peripheral direction of the wall portion 15. All of these four jet nozzles 46 are disposed with a horizontal inward orientation when the apparatus body 2 is seen in a side view. They are also disposed in such a manner that the pulse jets 47 thereof will intersect each other at the center of the apparatus body 2 when the apparatus body 2 is seen in a plan view. With this construction, the granules which have grown too large as a result of coagulation thereof will be crushed instantaneously as being directly impinged on by the pulse jets 47.

Further, the granules or the like which were not crushed directly will also be moved inwardly in the apparatus body 2 by the pulse jets 37 ejected from the four positions, so that these granules will be caused to strongly collide against each other in the vicinity of the center portion to be crushed thereby. Accordingly, it is possible to restrict the growth of granules to a predetermined range, whereby granules having a desired granule diameter can be obtained.

Incidentally, in order to obtain such granules having a desired granule diameter, it is necessary to maintain the temperature/humidity inside the granulating chamber appropriately. For instance, if the liquid material 3 dries too slowly, the coagulation among the granules tends to occur, leading to a wide size distribution of the resultant granules. For this reason, the temperature/humidity of the fluidizing air 6 will be appropriately adjusted, depending on the drying degree of the sprayed droplets, etc. These temperature and humidity are measured by an entrance thermometer 16 and an entrance hygrometer 17 provided to the air feed port 9. The fluidizing air 6 past the granulating chamber 6 will be discharged from the air exhaust port 7 by using the exhauster 8. In doing this, the temperature and humidity of the exhausted fluidizing air 6 will be measured by an exit thermometer 16b and an exit hygrometer 17b provided to the air exhaust port 7.

The results of measurement of the temperature and humidity at the air exhaust port 7 together with the results of measurement of the temperature and humidity at the air feed port 9 are useful for grasping and adjusting the temperature and humidity conditions inside the granulating chamber 1. That is, by appropriately adjusting the air supply amount or humidity of the fluidizing air 6 based on the measurement results, it is possible to optimize the temperature/humidity inside the granulating chamber 1.

In this embodiment, a plurality of nozzles 4 for jetting the liquid material 3 upwardly are disposed at positions offset from the center of the bottom of the granulating chamber 1. By providing a plurality of nozzles in this manner, it is possible to spray the liquid material 3 to the entire inside of the granulating chamber 1. Accordingly, it is possible to minimize the mutual coagulation of the granules in the course of manufacture thereof Also, by providing a plurality of nozzles, it is possible to enlarge the granulating chamber 1 correspondingly.

According to this embodiment, as shown in FIGS. 15 and 16, the air blowoff portion 5 is disposed around a cone member 48 having a conical face and can be moved downwardly relative to this cone member 48. With this downward movement, there is formed a gap 49 between the cone member 48 and the air blowoff portion 5. This gap 49 is utilized as a product outlet 19 for taking out the granules whose granulation has been completed. With this construction, it is possible to manufacture granules in a continuous manner.

As described above, the sprayed liquid material 3 will float and flow inside the granulating chamber 1 to be formed into fine primary particles. And, as additional liquid material 3 is sprayed onto these fine primary particles 1, there are formed granules having dense structure; and those granules which have grown to a certain extent will collide against each other to be coagulated, whereby large granules will be formed.

The granules which have coagulated and increased in weight will form a fluidizing layer R at the lower region of the granulating chamber 1. However, as these coagulated granules are subjected to the pulse jets 47 as described above, the granules will be crushed, thus inhibiting growth thereof beyond a predetermined size. That is, with the apparatus of the present invention, there may be formed granules each formed by coagulation of particles of a predetermined size.

The granules obtained by the granulation using the pulse jets 47 described above exhibited a cross section condition having more voids than those obtained without using such pulse jets 47.

The bulk density of the granules showed a smaller value when the pulse jets 47 were employed. Further, this bulk density decreased as the pressure of the pulse jet 47 increased. This is believed to be attributable to the fact that higher pressure of the pulse jet 47 restricts the grown of individual granule forming the granule so as to form granules with increased voids therein.

The size of the resultant granules can be adjusted by adjusting the pulse interval when the pulse jets 47 are jetted or the jetting pressure of the pulse jets 47. For instance, the shorter the jetting interval of the pulse jet 47 and the higher the jetting pressure of the pulse jet 47, the smaller the size of the resultant granule. This is because the pulse jet 47 having a higher pressure can apply a higher impact to the granule under manufacture. Moreover, the higher the pressure, the larger the area the pulse jet 47 can exerts its effect inside the granulating chamber 1, thereby increasing the opportunity for a particular granule to be subjected to the impact from the pulse jet 47, thus restricting excessive growth of the granule.

The granules obtained by this manufacturing apparatus provide superior fluidity when charged into a mold and provide also a shorter period until the granules are crushed when subjected to an external force. Accordingly, the granules having such properties can be readily charged into a mold and can be formed into tablets easily.

The hardness of the tables formed by compression of these granules tends to be higher as the pressure of the pulse jets 47 is increased. And, with higher pressure of the pulse jets 47, the resultant granules have more voids therein. However, such granules can be broken more easily than dense granules. Then, the granules will be crushed speedily inside the mold during the tablet forming process, thus providing increased compacted strength, thus increased hardness.

Fifth Embodiment

Figure 17:
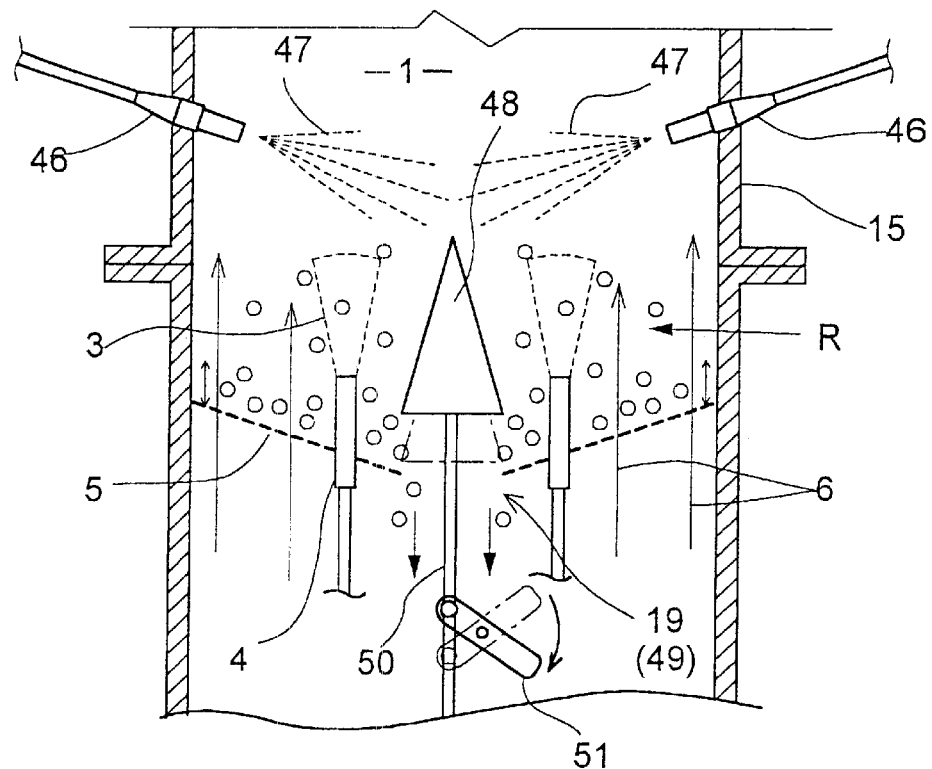
FIG. 17 is a vertical section showing principal portions of a manufacturing apparatus relating to a fifth embodiment.

The type of the jet nozzle 47 is not limited to the foregoing embodiments, but may have an alternative construction shown in FIG. 17. That is, the spraying direction of the pulse jet 47 may be oriented to the center of the granulating chamber 1 and with slight lower inclination as well.

With this construction, the pulse jet 47 will be jetted in the direction opposing the granules applied with the upward velocity by the fluidizing air 6, so that an even stronger impact may be applied to these granules. As a result, even such granules having a stronger mutual coagulating force can be manufactured with effectively restricting coagulation thereof.

In this embodiment, for taking out the granules, the cone member 48 is adapted to be moved upward. This vertical movement of the cone member 48 is provided by e.g. an operation of a lever member attached to the support shaft of the cone member 48. This operation can be manual or automatic. In the case of automatic operation, this may be done by operating the lever member by predetermined intervals or by operating the same based on detection of e.g. the weight of the formed granules. Any other construction can also be employed as desired.

Sixth Embodiment

Figure 18:
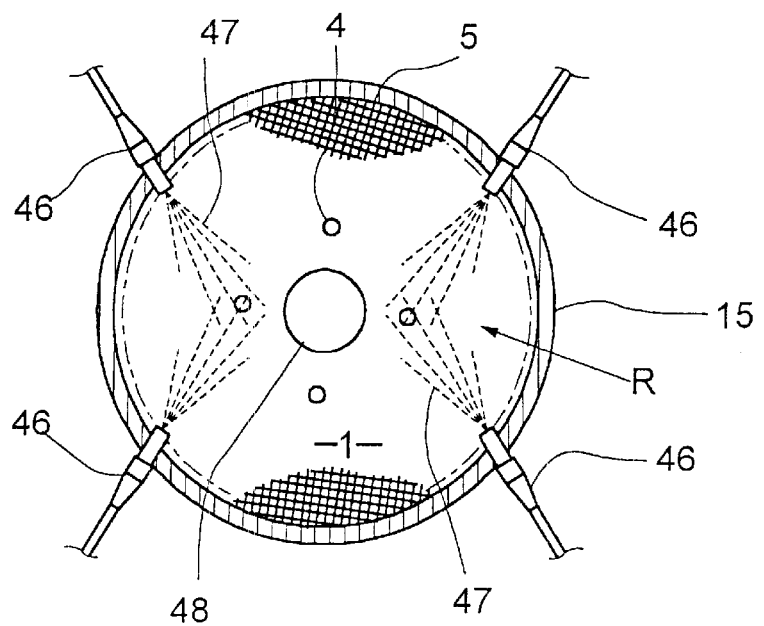
FIG. 18 is an explanatory view showing an attachment condition of a jet nozzle relating to a sixth embodiment.

The jet nozzles 46 employed in the fifth embodiment above are provided at four positions along the periphery of the granulating chamber 1 as shown in FIG. 18. Adjacent two jet nozzles 46 form a pair and jets of this pair of jet nozzles 46 will intersect each other inside the fluidizing layer R. And, a further arrangement is made such that the intersection point of one pair of pulse jets 47 is different from the intersection point of the other pair of pulse jets 47.

With this construction, the crushing of the granules inside the fluidizing layer R takes place at a plurality of locations, so that the effective area of the crushing force of the pulse jets 47 can be extended. It should be noted, however, that in this case, the impact force to the granules will be smaller than the construction of FIG. 17. However, when granules having not so strong coagulating force are to be manufactured, it can be more effective to extend the effective area of the impact force than to increase the impact force. With the manufacturing apparatus of this construction, it is possible to efficiently manufacture granules having not so strong coagulating force during the manufacture thereof.

Moreover, by appropriately selecting the total number of the jet nozzles 46 employed, the number of the positions where the pulse jets 47 intersect each other, or the number of the jet nozzles 46 employed for causing the pulse jets 47 to intersect at a single point, it becomes readily possible to enlarge the apparatus.

Seventh Embodiment

Figure 19:
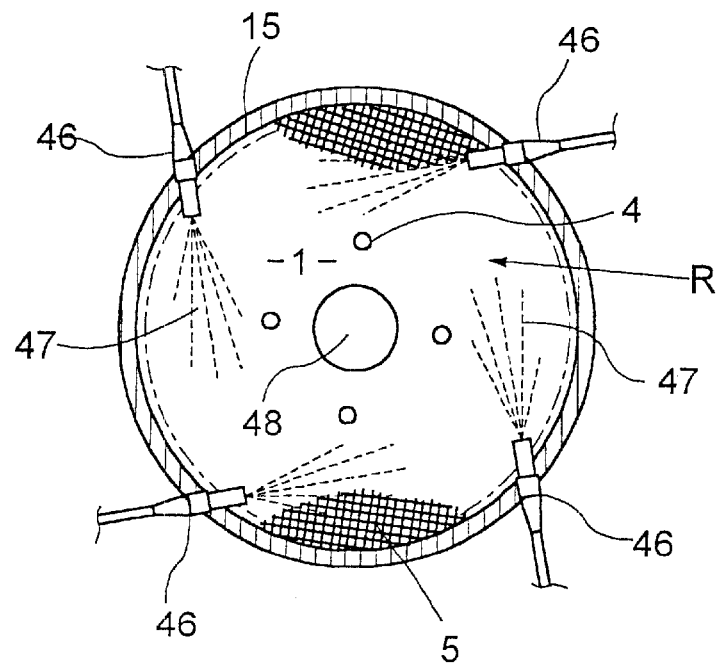
FIG. 19 is an explanatory view showing an attachment condition of a jet nozzle relating to a seventh embodiment.

The jet nozzles 46 may further alternatively constructed as shown in FIG. 19. Namely, a plurality of jet nozzles 46 are provided along the periphery of the granulating chamber 1 and the orientation of each jet nozzle 46 is offset by a predetermined angle from the center of the granulating chamber 1, thereby forming a swirling type fluidizing layer R.

With this construction, in comparison with the case shown in FIGS. 17 and 18, it is possible to further reduce the impact forces of the pulse jets 47. Moreover, as these impact forces can be distributed uniformly over the entire fluidizing layer R, the construction will be useful for e.g. allowing very fragile granules grow to a predetermined size.

Eighth Embodiment

Figure 20:
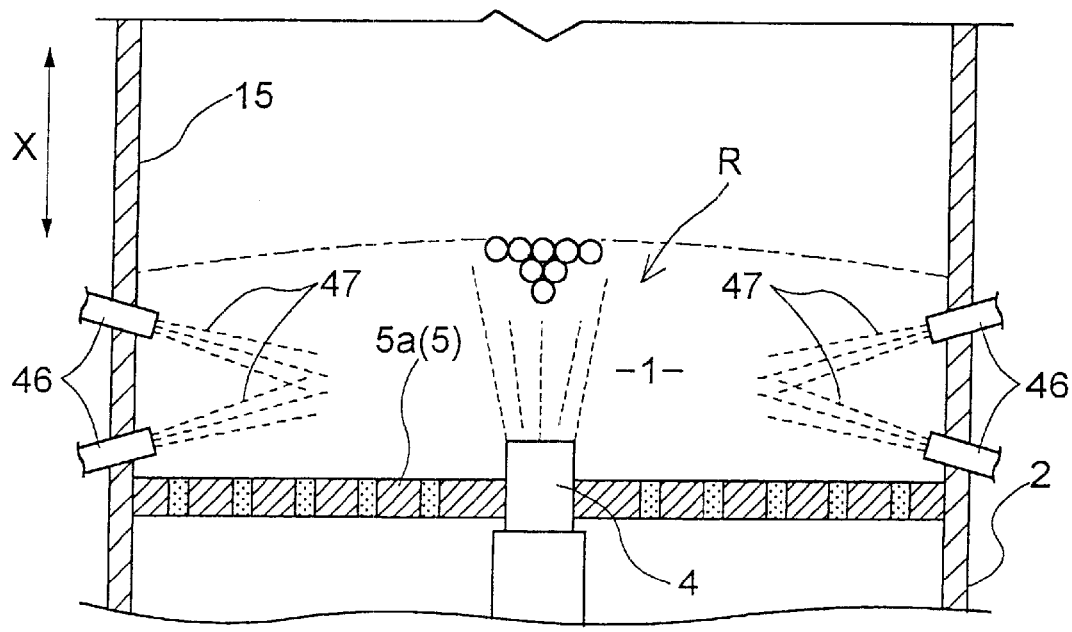
FIG. 20 is a side view showing an attachment condition of a jet nozzle relating to an eighth embodiment.

The manufacturing apparatus relating to the present invention may be alternatively constructed such that a plurality of jet nozzles 46 are distributed along the vertical direction X as shown in FIG. 20.

Of these, those jet nozzles 46 disposed at lower positions are mounted with a slight upward orientation, whereas the other jet nozzles 46 disposed at upper positions are mounted with a slight downward orientation. The construction for causing the high-pressure airs from these two jet nozzles 46 to intersect each other is same as those employed in the foregoing embodiments.

With this construction too, like the sixth embodiment described above, it is readily possible to enlarge the manufacturing apparatus.

Incidentally, the jet nozzles 46 disclosed in the above-described fourth through eighth embodiments can be used not only for the manufacturing apparatuses of the respective embodiments corresponding thereto, but can be used for the manufacturing apparatuses of all embodiments disclosed herein.

Ninth Embodiment

Figure 21:
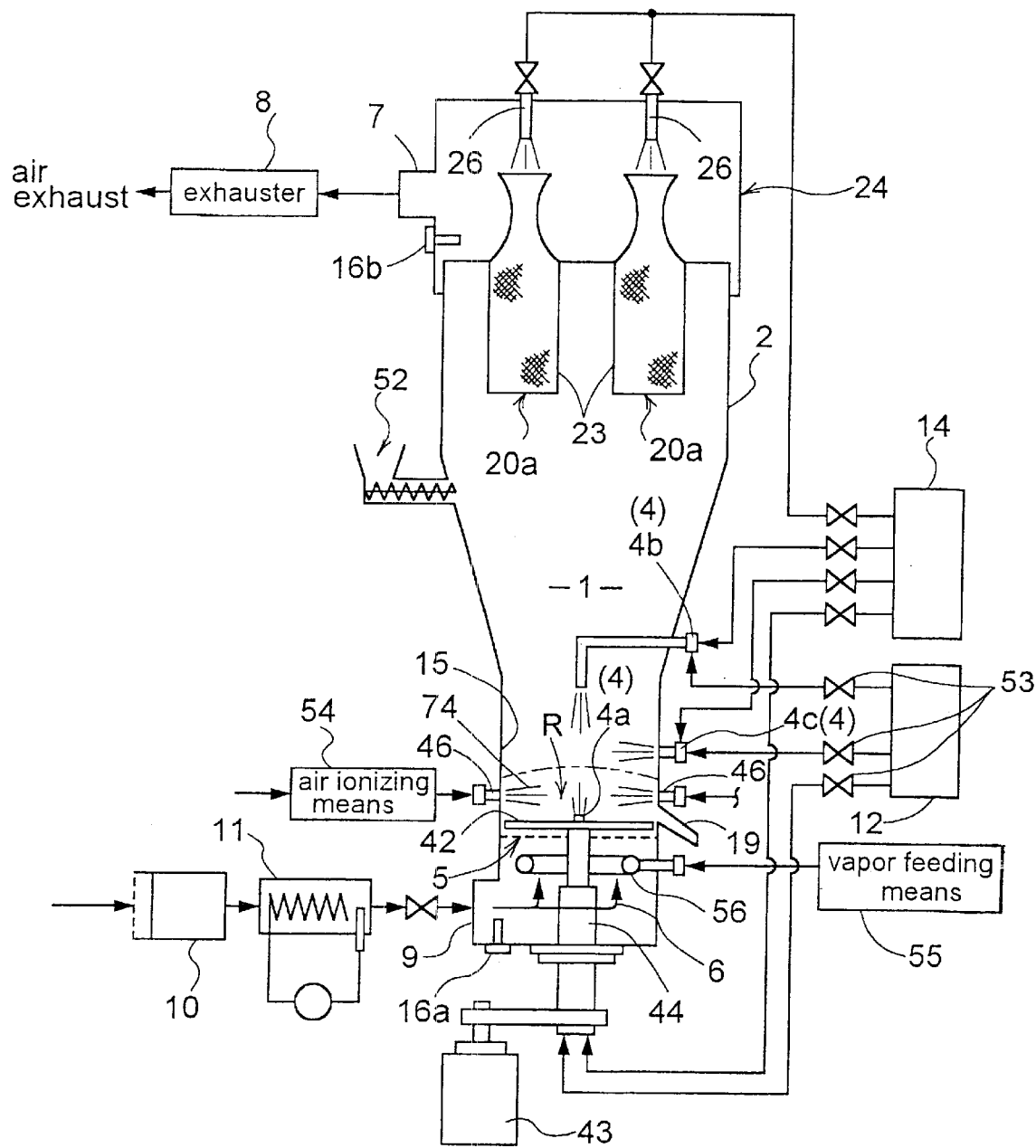
FIG. 21 is an explanatory view showing construction of a manufacturing apparatus relating to a ninth embodiment.
Figure 22:
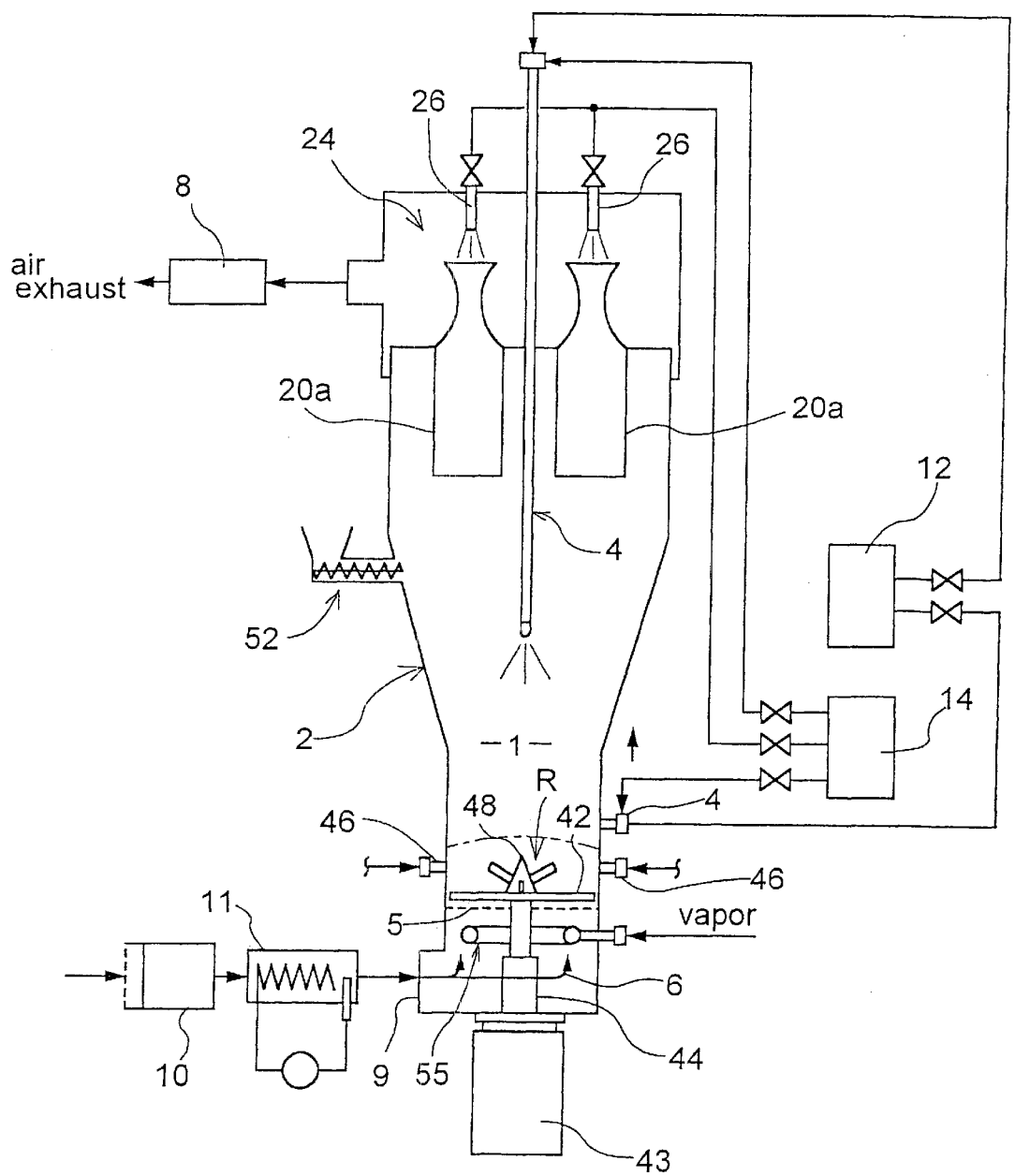
FIG. 22 is an explanatory view showing construction of a conventional manufacturing apparatus.

As shown in FIG. 21, the granule manufacturing apparatus of the present invention may include further nozzles 4 for spraying the liquid material downwardly and laterally, in addition to the upwardly oriented nozzles 4. In this discussion, the upwardly oriented nozzle will be referred to as a first nozzle 4a, the downwardly oriented nozzle will be referred to as a second nozzle 4b and the laterally or horizontally oriented nozzle will be referred to as a third nozzle 4c, respectively.

As shown in FIG. 21, the second nozzle 4b extends from the wall portion 15 of the apparatus body 2 to the center of the apparatus body 2 so as to spray the liquid material 3 downwardly at the center of the apparatus body 2. The third nozzle 4c may be attached to the wall portion 15 of the apparatus body 2, for instance.

The supply amount ratio of the liquid material 3 to each of the above-described nozzles 4a, 4b, 4c can be varied as desired by means of valves 53 provided downstream of the material feed pump 12.

The spraying operations of the liquid material 3 from these nozzles 4a, 4b, 4c can be effected continuously or intermittently. Further, it is possible to arrange so that the respective nozzles 4a, 4b, 4c effect the spraying operations thereof alternatively to each other. In short, it is necessary to appropriately vary the spraying condition so as to allow the liquid material 3 to be applied to the surface of each granule under manufacture uniformly.

Further, although FIG. 21 shows an example using the three kinds of nozzles 4a, 4b, 4c, it is also possible to employ only the first nozzle 4a and the second nozzle 4b, without using the third nozzle 4c.

The construction of this embodiment in which the liquid material 3 is sprayed from the plurality of nozzles 4a, 4b, 4c provides the following advantages.

For instance, when the manufacturing operation is effected by spraying the liquid material 3 without charging raw material particles into the granulating chamber 1, during the initial stage of the granulation, it is possible to reserve a greater inter-distance between the primary particles formed by drying and solidification of the sprayed droplets of the liquid material 3. Hence, it is possible to restrict mutual coagulation of the primary particles, so that very small granules can be manufactured.

Also, at the subsequent stage when the primary particles have grown to a certain extent to form granules, it is possible to allow the additional liquid material 3 to be applied uniformly to the individual particles. Hence, it is possible to render the growth degree of the individual particles uniform as well.

If the spraying operation is effected by distributing the liquid material 3 by using the second nozzle 4b and the third nozzle 4c, the amount of the liquid material 3 to be applied to each granule will be rendered uniform, so that a thinner liquid layer may be formed on the surface of the granule. Thus, the drying of the liquid film will take place reliably, thus reducing the possibility that the vicinity of the granule surface remains un-dried and undesired additional liquid film is applied thereto. As a result, a porous structure will hardly be formed. Moreover, since the granules are constantly compacted by means of the pressure applying means 22, heavier granules may be obtained.

Incidentally, in the case of using the apparatus of FIG. 21 too, it is possible to charge raw material particles for use in the manufacture of granules into the apparatus body 2 prior to the granulation, so that the particles are subsequently subjected to e.g. a coating process using the three nozzles 4a, 4b, 4c. In this case, for instance, the raw material particles may be charged from a particle supply inlet 52 formed in the wall portion 15 of the apparatus body 2. By using this particle supply inlet 52 and the product outlet 19, a continuous granulation operation is made possible.

(Air Ionizing Means)

The manufacturing apparatus shown in FIG. 21 includes the jet nozzles 46. From these jet nozzles 46, high-pressure air ionized by air ionizing means 54 is blown out. Namely, by ionizing the high pressure air, static electricity generated in association with the granulation process is neutralized, thus preventing mutual coagulation of the granules or generation of a spark.

The air ionizing means 54 may comprise electrodes attached to the leading end of the respective jet nozzle 46. Then, as a high voltage is being generated between the electrodes, the high pressure air is sprayed to flow adjacent the electrodes, so that the molecules of the high pressure air are broken down to generate ions of positive polarity and ions of negative polarity, thus producing the ionized air.

With the provision of this means, it is possible to neutralize charging of the granules which would occur otherwise with progress of drying of the granules. As a result, mutual coagulation of the granules may be restricted and the crushing of the granules may take place in an efficient manner.

Further, with neutralization of charging effect, it is possible to manufacture such highly ignitable granules in a safe manner.

(Vapor Feeding Means)

The granule manufacturing apparatus of this embodiment includes a vapor feeding means 55 disposed downwardly of the air blowoff portion 5. This vapor feeding means 55 is employed for e.g. sterilizing the granules to be manufactured.

This vapor feeding means 55 comprises e.g. an annular circular vapor spraying pipe 56. Into this vapor spraying pipe 56, steam is supplied from the outside of the apparatus body 2. And, the steam is sprayed upwardly from nozzle holes formed in the upper face of the vapor spraying pipe 56. The spraying of vapor may be carried out in a desired manner. For instance, a plurality of spraying operations may be effected at the final stage after completion of the granulation process of the granules.

The vapor feeding means 55 may be used also for other purposes than sterilization of the granules, including removal of clogging of the air blowoff portion 5 or the slits 45 and cleaning of the inside of the apparatus body 2. Such cleaning operations will be effected after the granules are discharged upon completion of the intended granulation process.

Tenth Embodiment

In the foregoing embodiments, ordinary air is employed as the fluidizing air 6 and/or the high-pressure air. Instead, e.g. ozone gas may be employed. When ozone gas is employed, it is possible to achieve the sterilizing effect on the granules.

Further, it is not necessary to supply ozone gas at all of the granulating stages. It may be supplied only at certain steps by an amount required for sterilization of granules.

The ozone gas may be supplied from either one or both of the air blowoff portion 5 and the jet nozzles 46.

Industrial Applicability

By using the granule manufacturing apparatus and method of the present invention, it is possible to manufacture e.g. granules of sodium nitrate, sodium acetate, titanium oxide, ceramic powder, medical product (ethenzamide probenecid, etc.), or granules for use in a variety of food products such as cocoa, coffee, etc.

Further, it is also possible to effect granulation of such materials as thermosetting resin solution which is hardened when heated, or coffee extract liquid, juice liquid etc. which loses its flavor if heated, or other materials which become difficult to be supplied or deteriorate in quality when heated, such as organic salts which deteriorate when heated or a slurry of highly volatile ceramic powder. etc.

What is claimed is:

1. An apparatus for manufacturing granules including:
   a spray nozzle disposed within a granulating chamber of an apparatus body for feeding by spraying into the granulating chamber a liquid material comprising at least one of mixture having solid and liquid in a mixed state and solution including solid dissolved therein;
   an air blowoff portion provided at a lower region of the granulating chamber for feeding air for floating and fluidizing the liquid material and fine particles under granulation inside the granulating chamber; and
   an air exhaust port provided at an upper region of the granulating chamber for exhausting the air present inside the granulating chamber,
   wherein the granulating chamber includes a cylindrical wall portion and a generally conical wall portion,
   the cylindrical wall portion is provided at a portion beside the spray nozzle,
   the spray nozzle is designed to spray the liquid material upwardly, is disposed at a lower center region of the granulating chamber, and includes a spraying opening which is located at a top or inwardly of a conical plane including the conical wall portion, and
   a bag filter is disposed between the spray nozzle and the air exhaust port, the bag filter having a backwashing unit, the bag filter providing the function of sweep-off means sweeping off solids collected on the bag filter as well as the function of pressure applying means for momentarily increasing the pressure inside the granulating chamber.

2. The apparatus for manufacturing granules according to claim 1, wherein the granulating chamber includes a jet nozzle for jetting high-pressure gas against a fluidizing layer formed in the lower region of the granulating chamber.

3. The apparatus for manufacturing granules according to claim 1, wherein the apparatus further comprises a downwardly directed spray nozzle disposed at an upper region inside the granulating chamber for downwardly spraying the liquid material inside the granulating chamber.

4. The apparatus for manufacturing granules according to claim 1, wherein the apparatus further comprises a horizontally directed spray nozzle attached to the cylindrical wall portion of the granulating chamber for laterally spraying the liquid material relative to the air current inside the granulating chamber.

5. The apparatus for manufacturing granules according to claim 1, wherein the bottom of the granulating chamber is constructed of a rotor in the form of a generally circular disc.

6. The apparatus for manufacturing granules according to claim 2, wherein the apparatus further comprises a downwardly directed spray nozzle disposed at an upper region inside the granulating chamber for downwardly spraying the liquid material inside the granulating chamber.

7. The apparatus for manufacturing granules according to claim 2, wherein the apparatus further comprises a horizontally directed spray nozzle attached to the cylindrical wall portion of the granulating chamber for laterally spraying the liquid material relative to the air current inside the granulating chamber.

8. The apparatus for manufacturing granules according to claim 3, wherein the apparatus further comprises a horizontally directed spray nozzle attached to the cylindrical wall portion of the granulating chamber for laterally spraying the liquid material relative to the air current inside the granulating chamber.

9. The apparatus for manufacturing granules according to claim 2, wherein the bottom of the granulating chamber is constructed of a rotor in the form of a generally circular disc.

10. The apparatus for manufacturing granules according to claim 3, wherein the bottom of the granulating chamber is constructed of a rotor in the form of a generally circular disc.

11. The apparatus for manufacturing granules according to claim 4, wherein the bottom of the granulating chamber is constructed of a rotor in the form of a generally circular disc.

12. An apparatus for manufacturing granules including:
a spray nozzle disposed within a granulating chamber of an apparatus body for feeding by spraying into the granulating chamber a liquid material comprising at least one of mixture having solid and liquid in a mixed state and solution including solid dissolved therein;
an air blowoff portion provided at a lower region of the granulating chamber for feeding air for floating and fluidizing the liquid material and fine particles under granulation inside the granulating chamber;
an air exhaust port provided at an upper region of the granulating chamber for exhausting the air present inside the granulating chamber; and
a jacket for circulating fluid provided over substantially entire outer periphery of the spray nozzle for optimizing the temperature of the liquid material to be sprayed and supplied,
wherein the spray nozzle includes a needle at a liquid spray opening thereof for spraying the liquid material, with the needle being shiftable between an opening position for opening the spray opening for the liquid material and a closing position for closing the spray opening for the liquid material, and
when the needle closes the liquid spray opening, the leading end of the needle projects from the liquid spray opening, so that even if solidification of the liquid material tends to occur at the liquid spray opening, the solidified material may be eliminated by the needle, whereby the liquid spray opening may be maintained under a clean condition.

13. The apparatus for manufacturing granules according to claim 12, wherein the spray nozzle is disposed at a lower region inside the granulating chamber for upwardly spraying the liquid material.

14. A method of manufacturing granules using a manufacturing apparatus including:
a spray nozzle disposed within a granulating chamber of an apparatus body for feeding by spraying into the granulating chamber a liquid material comprising at least one of mixture having solid and liquid in a mixed state and solution including solid dissolved therein;
an air blowoff portion provided at a lower region of the granulating chamber for feeding air for floating and fluidizing the liquid material and fine particles under granulation inside the granulating chamber; and
an air exhaust port provided at an upper region of the granulating chamber for exhausting the air present inside the granulating chamber,
wherein the granulating chamber includes a cylindrical wall portion and a generally conical wall portion,
the cylindrical wall portion is provided at a portion beside the spray nozzle,
the spray nozzle is disposed at a lower center region of the granulating chamber and includes a spraying opening which is located at a top or inwardly of a conical plane including the conical wall portion, and
a bag filter is disposed between the spray nozzle and the air exhaust port, the bag filter having a backwashing unit, the bag filter providing the function of sweep-off means sweeping off solids collected on the bag filter as well as the function of pressure applying means for momentarily increasing the pressure inside the granulating chamber;
the method comprising the steps of:
discharging a predetermined amount of the air from the air blowoff portion without charging any raw material particles into the granulating chamber;
spraying/supplying the liquid material from the spray nozzle into a current of the air;
causing sprayed droplets of the liquid material to float and flow inside the granulating chamber to form a group of particles; and
spraying/supplying additional liquid material from the spray nozzle to the group of floating and flowing particles for growing the particles into granules,
wherein said respective steps are effected while the backwashing unit is operated for sweeping off the solids collected on the bag filter and momentarily increasing the pressure inside the granulating chamber so as to compact the solids.

15. An apparatus for manufacturing granules including:
a spray nozzle disposed within a granulating chamber of an apparatus body for feeding by spraying into the granulating chamber a liquid material comprising at least one of mixture having solid and liquid in a mixed state and solution including solid dissolved therein;
an air blowoff portion provided at a lower region of the granulating chamber for feeding air for floating and fluidizing the liquid material and fine particles under granulation inside the granulating chamber; and
an air exhaust port provided at an upper region of the granulating chamber for exhausting the air present inside the granulating chamber,
wherein the spray nozzle being disposed at a lower center region of the granulating chamber so as to spray the liquid material upwardly,
a bag filter is disposed between the spray nozzle and the air exhaust port, the bag filter having a backwashing unit, the bag filter providing the function of sweep-off means sweeping off solids collected on the bag filter as well as the function of pressure applying means for momentarily increasing the pressure inside the granulating chamber, and
the granulating chamber contains a plurality of jet nozzles for jetting high-pressure gas against a fluidizing layer formed in the lower region of the granulating chamber, the jetting direction of the respective jet nozzles being oriented toward the center of the granulating chamber and with slight lower inclination.

16. An apparatus for manufacturing granules including:
a spray nozzle disposed within a granulating chamber of an apparatus body for feeding by spraying into the granulating chamber a liquid material comprising at least one of mixture having solid and liquid in a mixed state and solution including solid dissolved therein;

an air blowoff portion provided at a lower region of the granulating chamber for feeding air for floating and fluidizing the liquid material and fine particles under granulation inside the granulating chamber; and an air exhaust port provided at an upper region of the granulating chamber for exhausting the air present inside the granulating chamber, wherein the spray nozzle being disposed at a lower center region of the granulating chamber so as to spray the liquid material upwardly, a bag filter is disposed between the spray nozzle and the air exhaust port, the bag filter having a backwashing unit, the bag filter providing the function of sweep-off means sweeping off solids collected on the bag filter as well as the function of pressure applying means for momentarily increasing the pressure inside the granulating chamber, and the granulating chamber contains, at four positions about periphery thereof, jet nozzles for jetting high-pressure gas against a fluidizing layer formed in the lower region of the granulating chamber, adjacent two jet nozzles forming a group, the high-pressure airs jetted from this group of jet nozzles intersecting each other inside the fluidizing layer, an intersection point of the one group being different from an intersection point of the other group.

* * * * *

UNITED STATES PATENT AND TRADEMARK OFFICE
CERTIFICATE OF CORRECTION

PATENT NO. : 6,695,989 B1
DATED : February 24, 2004
INVENTOR(S) : Hiroyuki Tsujimoto It is certified that error appears in the above-identified patent and that said Letters Patent is hereby corrected as shown below:

Column 1,
Line 37, delete "SUMMARY OF THE INVENTION".

Column 2,
Line 59, "DISLOSURE OF THE INVENTION"
should read -- SUMMARY OF THE INVENTION --.

Signed and Sealed this

Eighth Day of June, 2004

JON W. DUDAS
*Acting Director of the United States Patent and Trademark Office*